United States Patent
Huang et al.

(10) Patent No.: US 11,725,787 B2
(45) Date of Patent: Aug. 15, 2023

(54) DOWNLIGHT APPARATUS

(71) Applicant: XIAMEN ECO LIGHTING CO. LTD., Xiamen (CN)

(72) Inventors: Huiyong Huang, Xiamen (CN); Zhenyu Tang, Xiamen (CN); Shuxing Gao, Xiamen (CN)

(73) Assignee: XIAMEN ECO LIGHTING CO. LTD., Xiamen (CN)

( * ) Notice: Subject to any disclaimer, the term of this patent is extended or adjusted under 35 U.S.C. 154(b) by 0 days.

(21) Appl. No.: 17/470,968

(22) Filed: Sep. 9, 2021

(65) Prior Publication Data
US 2022/0074583 A1    Mar. 10, 2022

(30) Foreign Application Priority Data

| Sep. 9, 2020 | (CN) | 202021962277.X |
| Sep. 9, 2020 | (CN) | 202021962480.7 |
| Sep. 9, 2020 | (CN) | 202021962759.5 |
| Sep. 9, 2020 | (CN) | 202021963435.3 |
| Sep. 9, 2020 | (CN) | 202021963476.2 |
| Sep. 10, 2020 | (CN) | 202021973305.8 |
| Sep. 10, 2020 | (CN) | 202021973469.0 |
| Sep. 10, 2020 | (CN) | 202021973704.4 |
| Sep. 10, 2020 | (CN) | 202021973937.4 |
| Sep. 10, 2020 | (CN) | 202021974013.6 |

(Continued)

(51) Int. Cl.
*F21S 8/02* (2006.01)
*F21V 21/04* (2006.01)
(Continued)

(52) U.S. Cl.
CPC ............... *F21S 8/026* (2013.01); *F21S 8/02* (2013.01); *F21V 15/01* (2013.01); *F21V 21/04* (2013.01);
(Continued)

(58) Field of Classification Search
CPC .. F21S 8/026; F21S 8/02; F21V 15/01; F21V 21/04; F21V 21/14; F21V 23/003;
(Continued)

(56) References Cited

U.S. PATENT DOCUMENTS

| 8,405,947 B1 * | 3/2013 | Green | F21V 21/04 |
| | | | 361/103 |
| 10,584,858 B1 * | 3/2020 | Boulanger | F21K 9/20 |

(Continued)

*Primary Examiner* — Tsion Tumebo
(74) *Attorney, Agent, or Firm* — Chun-Ming Shih; Lanway IPR Services

(57) ABSTRACT

A downlight apparatus includes a light source, a driver box, a light housing and a heat dissipation plate. The driver box is used for storing a driver. The driver is connected to an external power source to generate a driving current to the light source. The light housing has a light holder and a rim. The light source is stored in the light holder. The rim defines a light opening for a light of the light source to escape. The heat dissipation plate is placed between the light holder and the driver box for carrying away both heat of the driver box and the light source. The heat dissipation plate is a separate metal piece from the driver box and the light housing. The heat dissipation plate has a portion not covered by the light holder and the driver box and exposed to air.

17 Claims, 47 Drawing Sheets

(30) Foreign Application Priority Data

Sep. 10, 2020 (CN) .......................... 202021974312.X
Sep. 10, 2020 (CN) .......................... 202021974314.9
Sep. 10, 2020 (CN) .......................... 202021974622.1

(51) Int. Cl.

| | |
|---|---|
| *F21V 23/00* | (2015.01) |
| *F21V 23/04* | (2006.01) |
| *F21V 21/14* | (2006.01) |
| *F21V 29/70* | (2015.01) |
| *F21V 15/01* | (2006.01) |
| *F21V 8/00* | (2006.01) |
| *F21V 21/26* | (2006.01) |
| *F21Y 115/10* | (2016.01) |

(52) U.S. Cl.
CPC .............. *F21V 21/14* (2013.01); *F21V 21/26* (2013.01); *F21V 23/003* (2013.01); *F21V 23/007* (2013.01); *F21V 23/04* (2013.01); *F21V 29/70* (2015.01); *G02B 6/0085* (2013.01); *F21V 21/047* (2013.01); *F21V 21/049* (2013.01); *F21Y 2115/10* (2016.08)

(58) Field of Classification Search
CPC .......... F21V 23/00; F21V 23/04; F21V 29/70; F21V 29/10; G02B 6/0085; F21Y 2115/10
See application file for complete search history.

(56) References Cited

U.S. PATENT DOCUMENTS

| | | | |
|---|---|---|---|
| 10,928,042 B2* | 2/2021 | Dong | F21V 21/04 |
| 11,028,983 B2* | 6/2021 | Ye | F21V 29/70 |
| 11,098,885 B1* | 8/2021 | Huang | F21V 23/007 |
| 11,248,783 B2* | 2/2022 | Huang | F21S 8/026 |
| 2014/0056026 A1* | 2/2014 | Boomgaarden | F21V 29/70 |
| | | | 362/609 |
| 2018/0206305 A1* | 7/2018 | Van Winkle | F21V 23/04 |
| 2019/0203893 A1* | 7/2019 | Ye | F21S 8/024 |

* cited by examiner

A — A

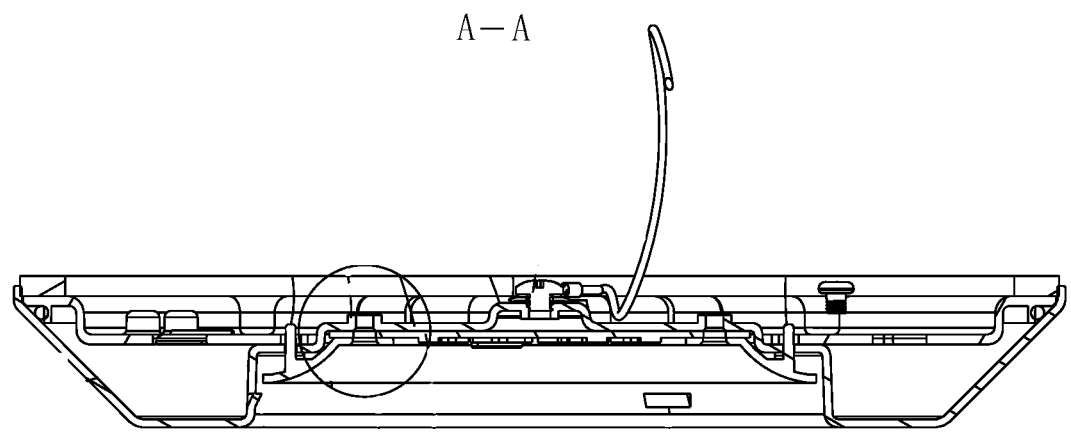
Flg. 40
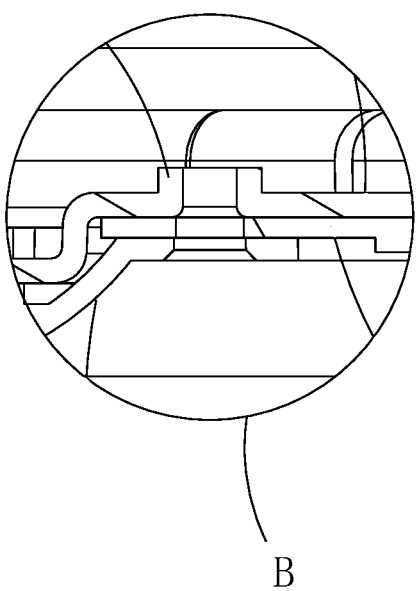
Fig. 41

C — C

D-D

DOWNLIGHT APPARATUS

FIELD

The present invention is related to a downlight apparatus, and more particularly related to a downlight apparatus with heat dissipation and water proof.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

Downlight devices are widely used in various places. It is beneficial to find out improvements of downlight devices to provide a more convenient and more safe downlight products.

In addition, it is important to provide a convenient assembly structure. The structure includes complexity reducing during manufacturing and during installation.

It is also important to consider heat dissipation and water proof.

Therefore, it is beneficial to design a light device with multiple advantages. Downlight devices are widely used in various places. It is beneficial to find out improvements of downlight devices to provide a more convenient and more safe downlight products.

In addition, it is important to provide a convenient assembly structure. The structure includes complexity reducing during manufacturing and during installation.

It is also important to consider heat dissipation and water proof.

Therefore, it is beneficial to design a light device with multiple advantages. Downlight devices are widely used in various places. It is beneficial to find out improvements of downlight devices to provide a more convenient and more safe downlight products.

In addition, it is important to provide a convenient assembly structure. The structure includes complexity reducing during manufacturing and during installation.

It is also important to consider heat dissipation and water proof.

Therefore, it is beneficial to design a light device with multiple advantages. Downlight devices are widely used in various places. It is beneficial to find out improvements of downlight devices to provide a more convenient and more safe downlight products.

In addition, it is important to provide a convenient assembly structure. The structure includes complexity reducing during manufacturing and during installation.

It is also important to consider heat dissipation and water proof.

Therefore, it is beneficial to design a light device with multiple advantages.

SUMMARY

In some embodiments, a downlight apparatus includes a light source, a driver box, a light housing and a heat dissipation plate.

The driver box is used for storing a driver.

The driver is connected to an external power source to generate a driving current to the light source.

The light housing has a light holder and a rim.

The light source is stored in the light holder.

The rim defines a light opening for a light of the light source to escape.

The heat dissipation plate is placed between the light holder and the driver box for carrying away both heat of the driver box and the light source.

The heat dissipation plate is a separate metal piece from the driver box and the light housing.

The heat dissipation plate has a portion not covered by the light holder and the driver box and exposed to air.

In some embodiments, the heat dissipation plate is an elongated bar.

In some embodiments, the light holder has a holder plate and a holder wall defining a holder cavity.

The light source is placed on an inner side of the holder plate in the holder cavity.

The holder plate has a substantial diameter as the driver box.

The elongated bar has two ends exposed outside an overlapping area of the holder plate and the driver box.

In some embodiments, the elongated bar have a bar body and two bar blocks.

The bar blocks are protruding from the bar body, limiting a relative position of the driver box to the light holder.

In some embodiments, the bar blocks are a folded block from the bar body.

In some embodiments, the elongated bar is attached with two torsion springs on two bar ends of the elongated bar.

In some embodiments, the two bar ends are folded with respect to a bar body of the elongated bar.

In some embodiments, a protruding rib structure is formed in a middle of the elongated bar facing to the light source.

In some embodiments, a driver plate is placed inside the driver box.

The driver plate is kept a distance from a bottom of the driver box and the light holder.

In some embodiments, the driver plate is exposed facing to the elongated bar.

In some embodiments, the light source includes a light source plate attached to the heat dissipation plate.

In some embodiments, a top plate of the driver box has a wire socket and a manual switch.

The wire socket is connected to a power wire and the manual switch is used for adjusting a setting of the light source.

In some embodiments, the top plate of the driver box further has a rotation switch for continuously setting a maximum light intensity of the light source.

In some embodiments, the light housing is made of metal material and is connected to ground via the heat dissipation plate.

In some embodiments, a light source plate of the light source is connected to the elongated bar with a metal screw for carrying heat away.

In some embodiments, the light source includes a LED module, a light guide plate and a light passing cover.

The rim has an protruding part extended inwardly from a connection of the rim and a holder wall of the light holder corresponding to a curved part of the light passing cover.

In some embodiments, the curved part of the light passing cover engages the protruding part of the rim.

In some embodiments, the protruding part has a convex part and a concave part fitting a surface of the curved part of the light passing cover.

In some embodiments, the light passing cover is clipped between the light guide plate and the protruding part of the rim.

In some embodiments, the light passing cover includes multiple lens.

BRIEF DESCRIPTION OF DRAWINGS

FIG. 40 illustrates another example in a cross-sectional view.

FIG. 41 illustrates a zoom-up view of a connection between components.

DETAILED DESCRIPTION

Figure 87:
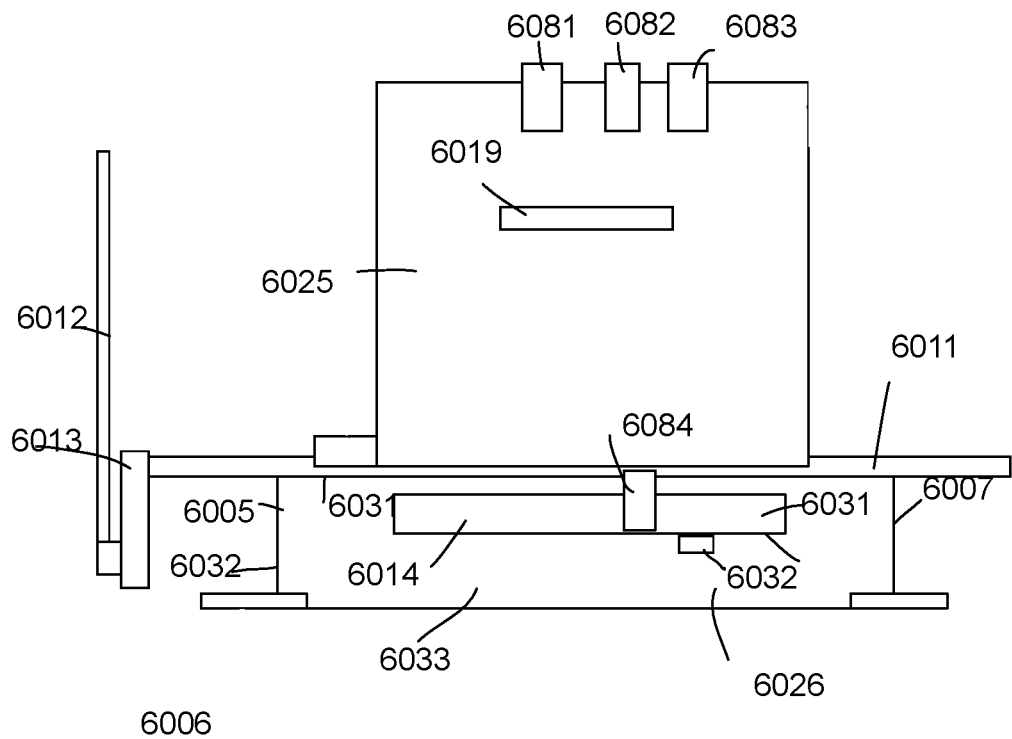
FIG. 87 shows another downlight embodiment.

In FIG. 87, a downlight apparatus includes a light source 6014, a driver box 6025, a light housing 6007 and a heat dissipation plate 6011.

The driver box 6025 is used for storing a driver 6019.

The driver 6019 is connected to an external power source to generate a driving current to the light source. For example, a 110V AC power is connected to the driver 6019 via a power wire.

The light housing 6007 has a light holder 6005 and a rim 6006.

The light source 6014 is stored in the light holder 6005.

The rim 6006 defines a light opening 6026 for a light of the light source 6014 to escape.

The heat dissipation plate 6011 is placed between the light holder 6005 and the driver box 6025 for carrying away both heat of the driver box 6025 and the light source 6014.

The heat dissipation plate is a separate metal piece from the driver box and the light housing. In such embodiments, the heat dissipation plate is not fixed to either the drive box 6025 or the light holder 6005.

The heat dissipation plate 6011 has a portion 6015 not covered by the light holder 6005 and the driver box 6025 and exposed to air.

Figure 35:
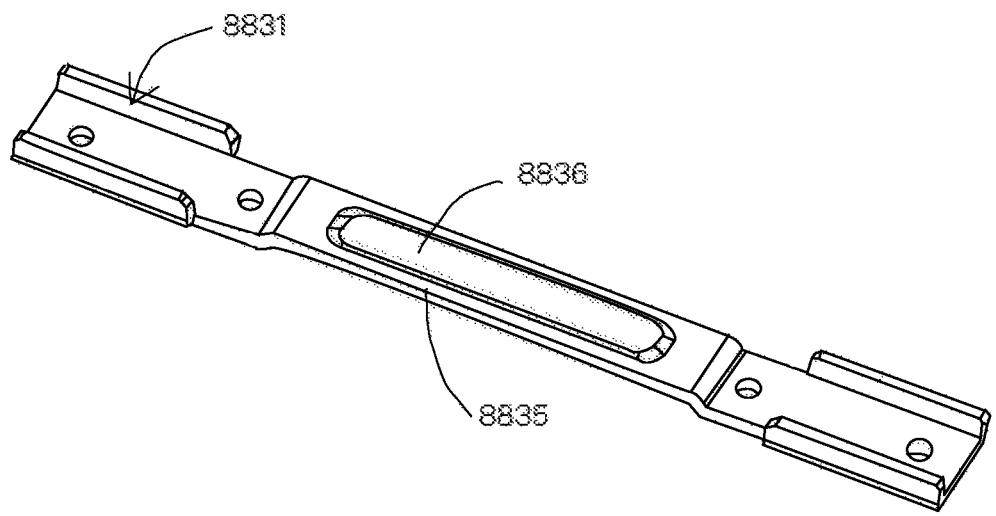
FIG. 35 illustrates a heat dissipation plate in an elongated form.

In FIG. 35, the heat dissipation plate is an elongated bar.

In some embodiments, the light holder has a holder plate 6031 and a holder wall 6032 defining a holder cavity 6033.

The light source 6014 is placed on an inner side of the holder plate 6031 in the holder cavity.

Figure 32:
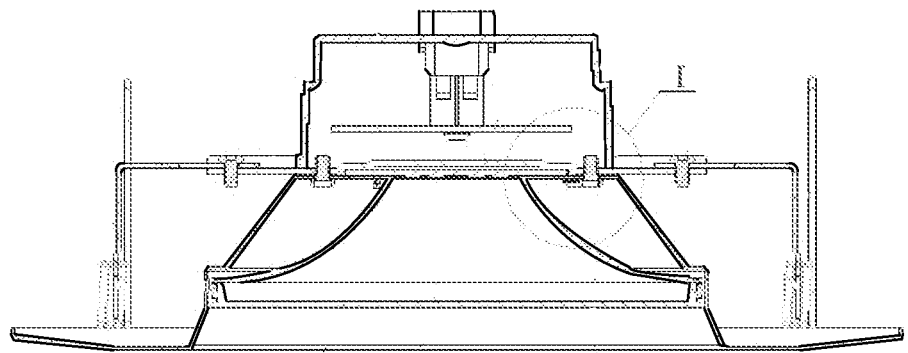
FIG. 32 illustrates a heat dissipation plate placed between a driver box and a light housing.

The holder plate has a substantial identical diameter as the driver box in some embodiments, as shown in FIG. 32.

The elongated bar has two ends exposed outside an overlapping area of the holder plate and the driver box.

In FIG. 35, the elongated bar have a bar body 8835 and two bar blocks 8831.

FIG. 32 shows the driver box 881 is aligned and positioned with the bar blocks 8831.

The bar blocks are protruding from the bar body 8835, limiting a relative position of the driver box to the light holder.

In some embodiments, the bar blocks 8831 are a folded block from the bar body, as shown in FIG. 35.

In FIG. 87, the elongated bar is attached with two torsion springs 6012 on two bar ends 6013 of the elongated bar.

In some embodiments, the two bar ends 6013 are folded with respect to a bar body of the elongated bar.

In FIG. 35, a protruding rib structure 8836 is formed in a middle of the elongated bar facing to the light source.

In FIG. 87, a driver plate 6019 is placed inside the driver box 6025.

The driver plate 6019 is kept a distance from a bottom of the driver box 6925 and the light holder 6005.

In some embodiments, the driver plate 6019 is exposed facing to the elongated bar. In other words, there is no bottom plate for the driver box 6025 but directly expose the driver plate 6019 to the light holder 6005.

In some embodiments, the light source includes a light source plate 6031 attached to the heat dissipation plate.

In some embodiments, a top plate 6084 of the driver box 6025 has a wire socket 6081 and a manual switch 6082.

The wire socket 6081 is connected to a power wire and the manual switch 6082 is used for adjusting a setting of the light source.

In some embodiments, the top plate of the driver box further has a rotation switch 6083 for continuously setting a maximum light intensity of the light source.

In some embodiments, the light housing is made of metal material and is connected to ground via the heat dissipation plate.

In some embodiments, a light source plate of the light source is connected to the elongated bar with a metal screw 6084 for carrying heat away.

In some embodiments, the light source includes a LED module, a light guide plate and a light passing cover.

Figure 70:
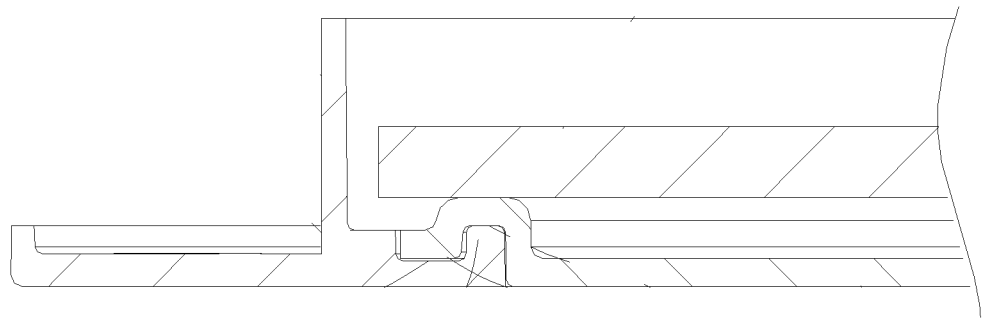
FIG. 70 illustrates a zoom-up view of the diffusion cover and related components.

In FIG. 70, the rim 98110 has an protruding part 98114 extended inwardly from a connection of the rim 98110 and a holder wall 98118 of the light holder corresponding to a curved part 98122 of the light passing cover 98120.

In some embodiments, the curved part 98122 of the light passing cover 98120 engages the protruding part 98114 of the rim 98110.

In some embodiments, the protruding part 98114 has a convex part 98117 and a concave part 98116 fitting a surface of the curved part 98122 of the light passing cover 98120.

In some embodiments, the light passing cover 98120 is clipped between the light guide plate 98130 and the protruding part 98117 of the rim 98110.

In some embodiments, the light passing cover includes multiple lens for creating a different light effect.

Figure 1:
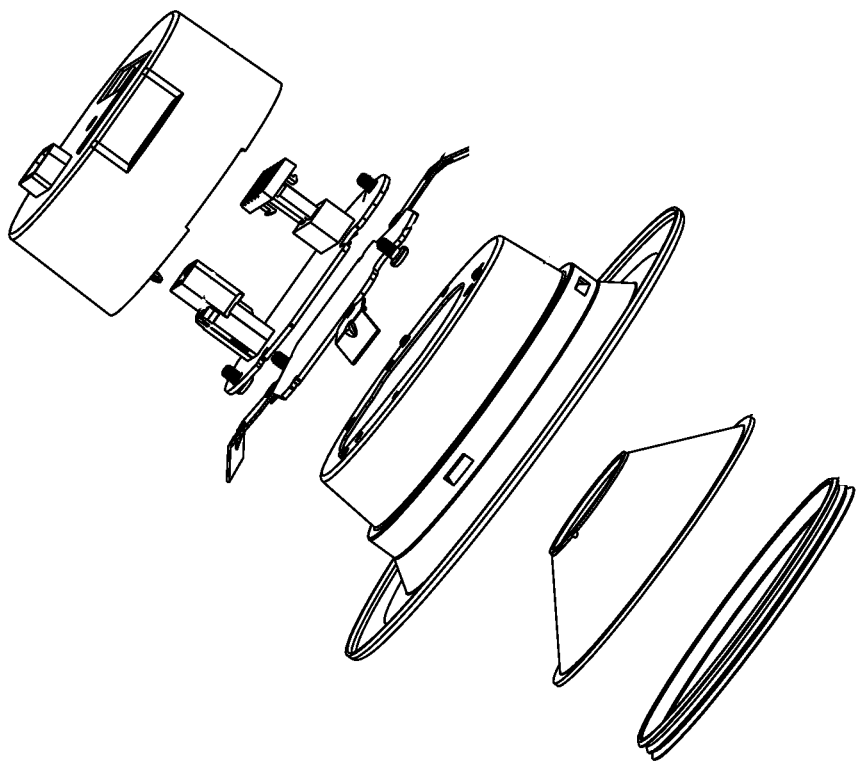
FIG. 1 illustrates an exploded view of a downlight apparatus.

FIG. 1 illustrates an exploded view of a downlight apparatus.

Figure 2:
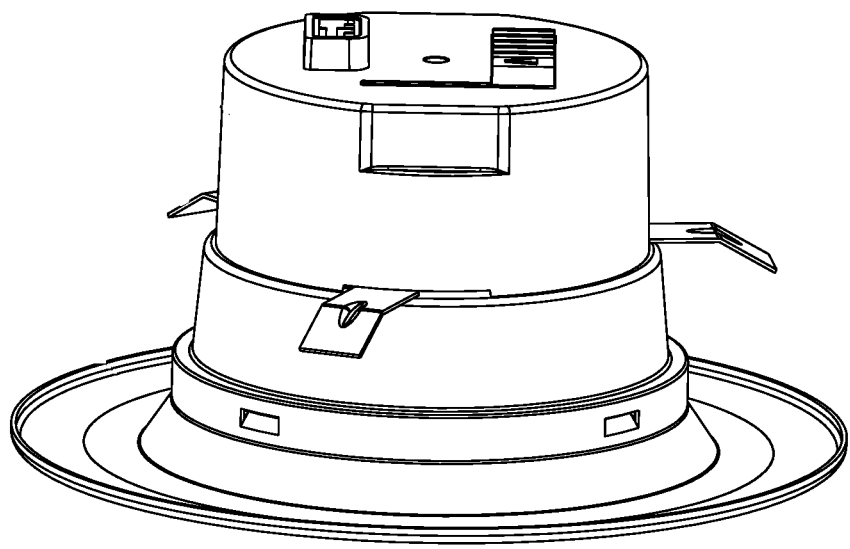
FIG. 2 illustrates a side view of the downlight apparatus of FIG. 1.

FIG. 2 illustrates a side view of the downlight apparatus of FIG. 1.

Figure 3:
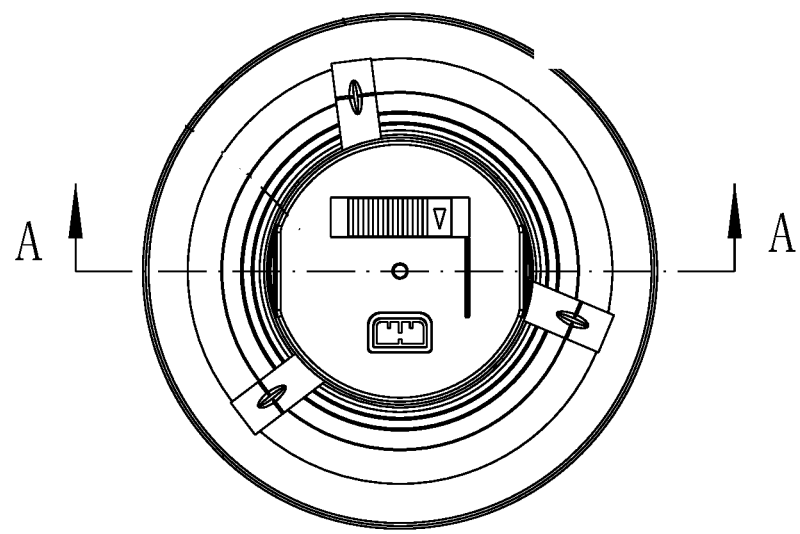
FIG. 3 illustrates a top view of the downlight apparatus of FIG. 1.

FIG. 3 illustrates a top view of the downlight apparatus of FIG. 1.

Figure 4:
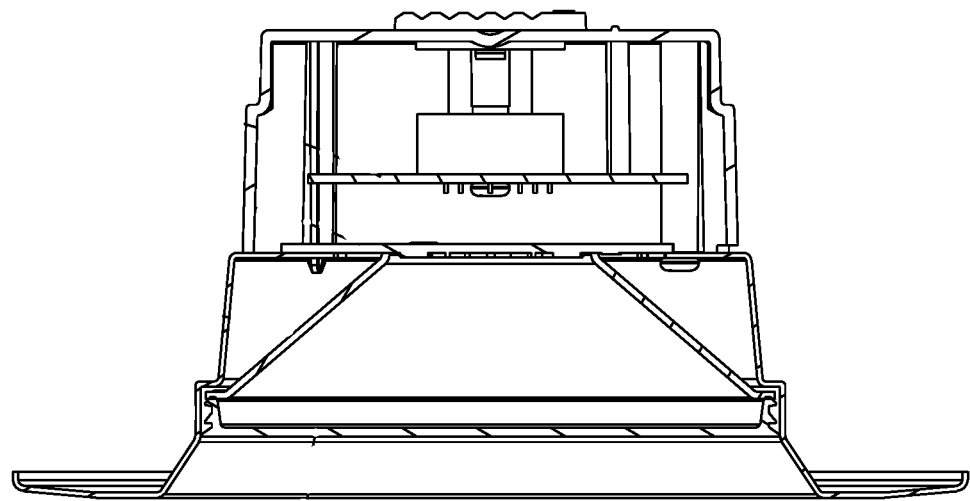
FIG. 4 illustrates a cross-sectional view of the example in FIG. 1.

FIG. 4 illustrates a cross-sectional view of the example in FIG. 1.

Figure 5:
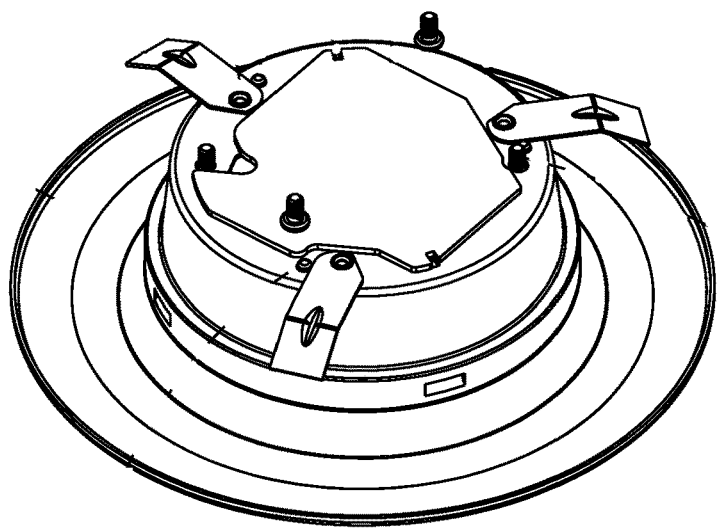
FIG. 5 illustrates a perspective view of the leaf spring and the light housing.

FIG. 5 illustrates a perspective view of the leaf spring and the light housing.

Figure 6:
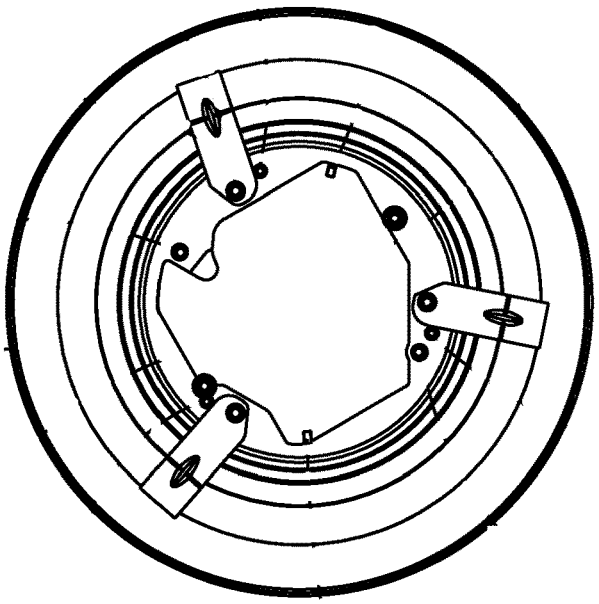
FIG. 6 illustrates a top view of the example in FIG. 5.

FIG. 6 illustrates a top view of the example in FIG. 5.

Figure 7:
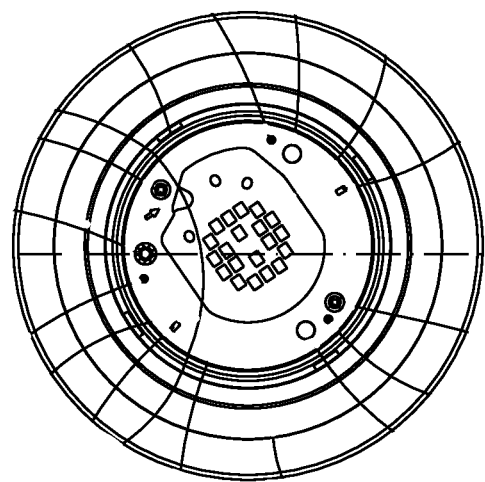
FIG. 7 illustrates a bottom view of the example in FIG. 5.

FIG. 7 illustrates a bottom view of the example in FIG. 5.

Figure 8:
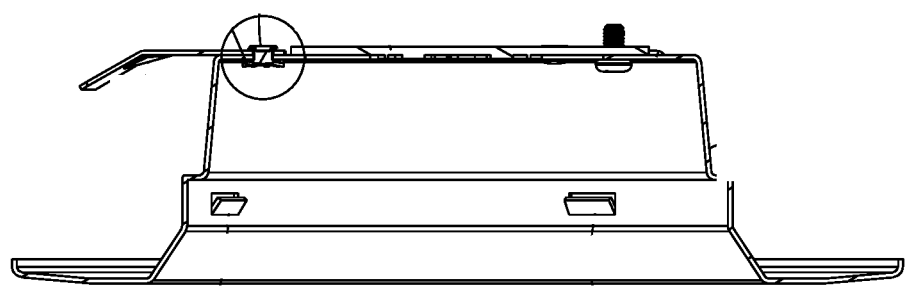
FIG. 8 illustrates a side view of the example in FIG. 5.

FIG. 8 illustrates a side view of the example in FIG. 5.

Figure 9:
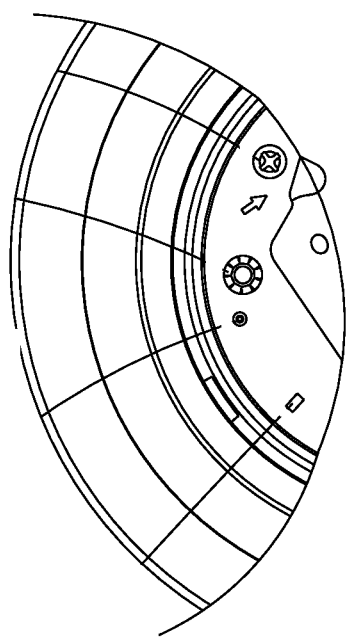
FIG. 9 illustrates a zoom-up view of a portion of the example in FIG. 5.

FIG. 9 illustrates a zoom-up view of a portion of the example in FIG. 5.

Figure 10:
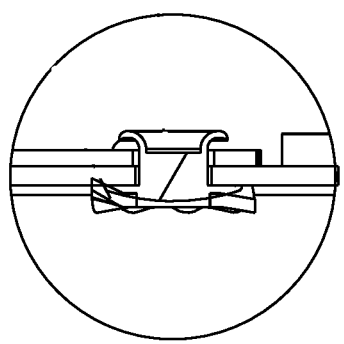
FIG. 10 illustrates a zoom-up view of a connection among multiple components.

FIG. 10 illustrates a zoom-up view of a connection among multiple components.

Figure 11:
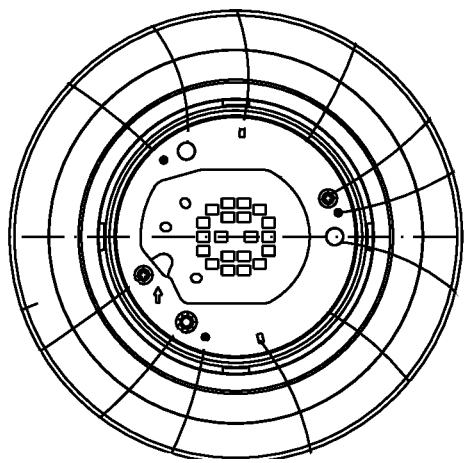
FIG. 11 illustrates another bottom view of another example.

FIG. 11 illustrates another bottom view of another example.

Figure 12:
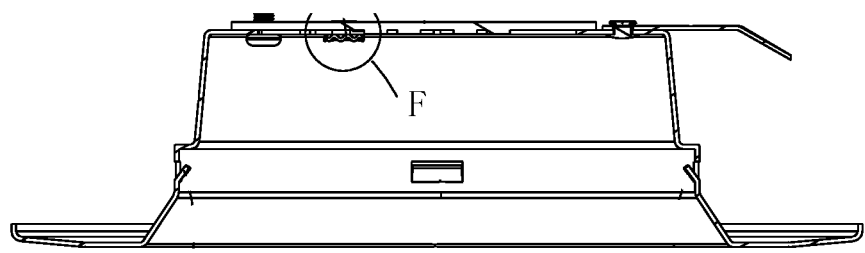
FIG. 12 illustrates a side view of another example.

FIG. 12 illustrates a side view of another example.

Figure 13:
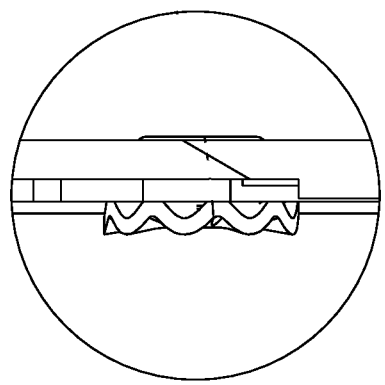
FIG. 13 illustrates a wave structure pad example.

FIG. 13 illustrates a wave structure pad example.

Figure 14:
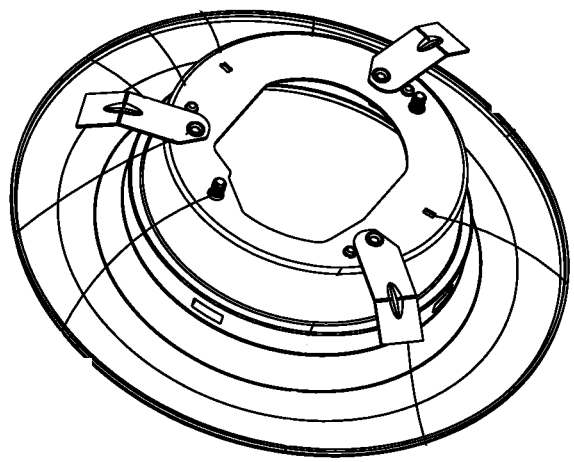
FIG. 14 illustrates another example of a light housing.

FIG. 14 illustrates another example of a light housing.

Figure 15:
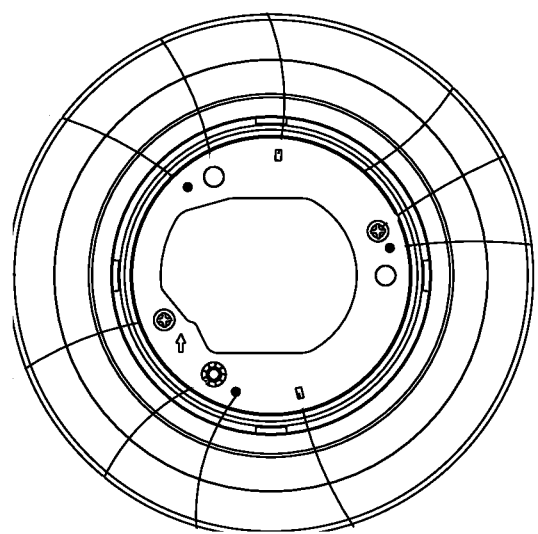
FIG. 15 illustrates a top view of the example in FIG. 14.

FIG. 15 illustrates a top view of the example in FIG. 14.

Figure 16:
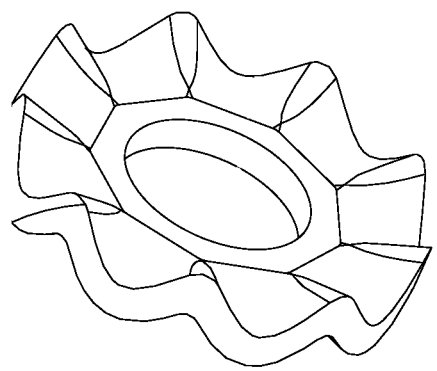
FIG. 16 illustrates an example of a wave structure pad.

FIG. 16 illustrates an example of a wave structure pad.

Figure 17:
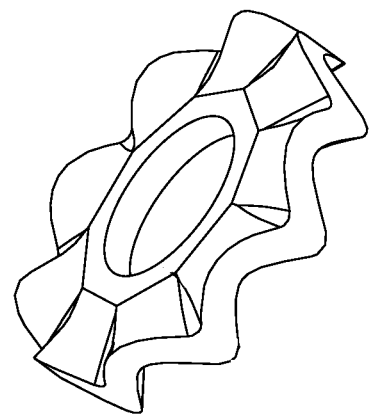
FIG. 17 illustrates another view of the example in FIG. 16.

FIG. 17 illustrates another view of the example in FIG. 16.

Figure 18:
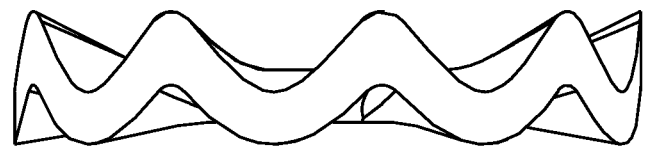
FIG. 18 illustrates another view of the example in FIG. 16.

FIG. 18 illustrates another view of the example in FIG. 16.

Figure 19:
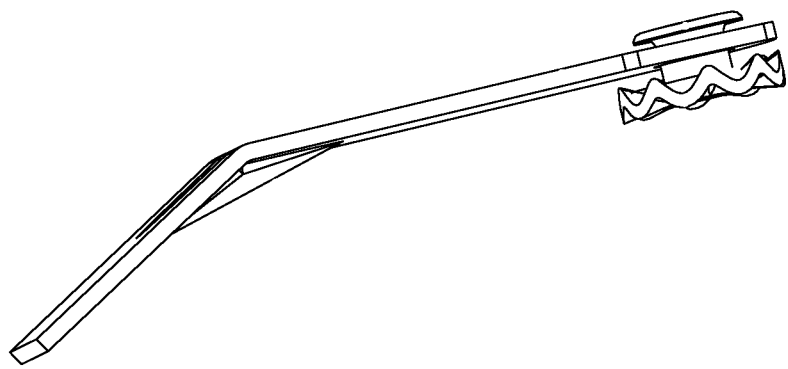
FIG. 19 illustrates a combination of the shaft connector, the leaf spring and the pad.

FIG. 19 illustrates a combination of the shaft connector, the leaf spring and the pad.

Figure 20:
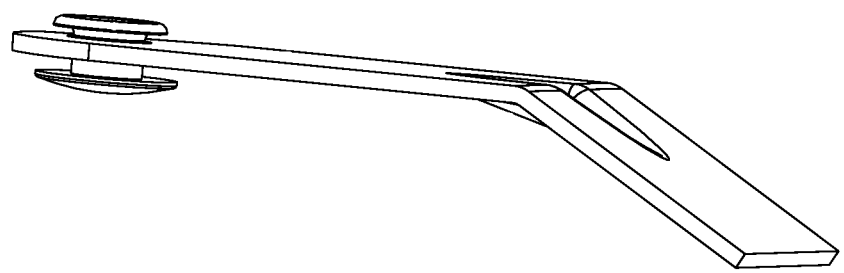
FIG. 20 illustrates another view of the example in FIG. 19.

FIG. 20 illustrates another view of the example in FIG. 19.

Figure 21:
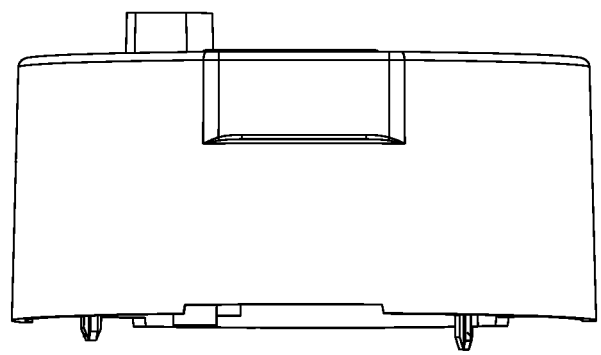
FIG. 21 illustrates a driver box example.

FIG. 21 illustrates a driver box example.

Figure 22:
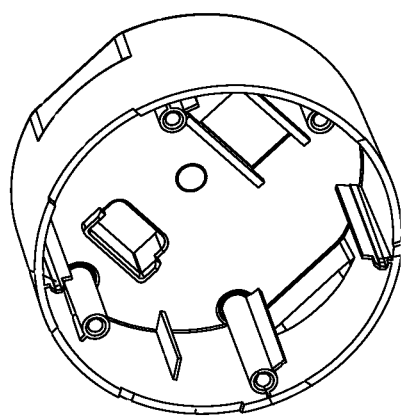
FIG. 22 illustrates another view of the example in FIG. 21.

FIG. 22 illustrates another view of the example in FIG. 21.

Figure 23:
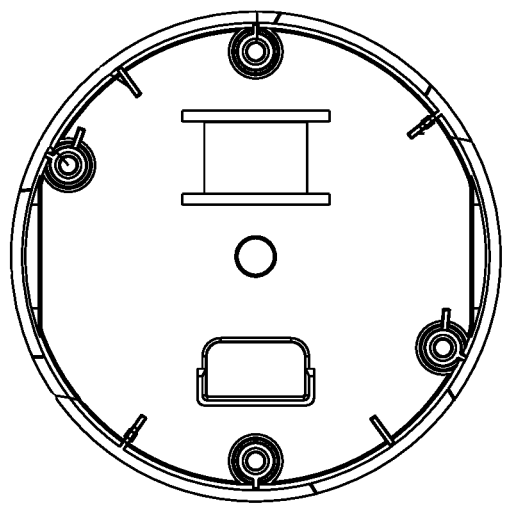
FIG. 23 illustrates another view of the example in FIG. 21.

FIG. 23 illustrates another view of the example in FIG. 21.

Figure 24:
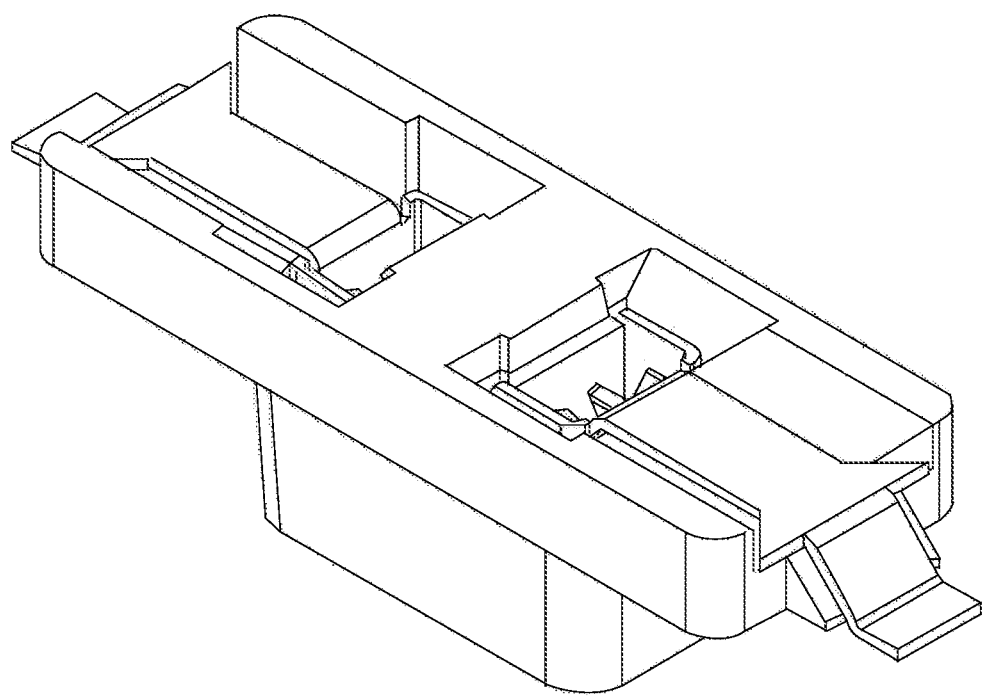
FIG. 24 illustrates a connector example.

FIG. 24 illustrates a connector example.

Figure 25:
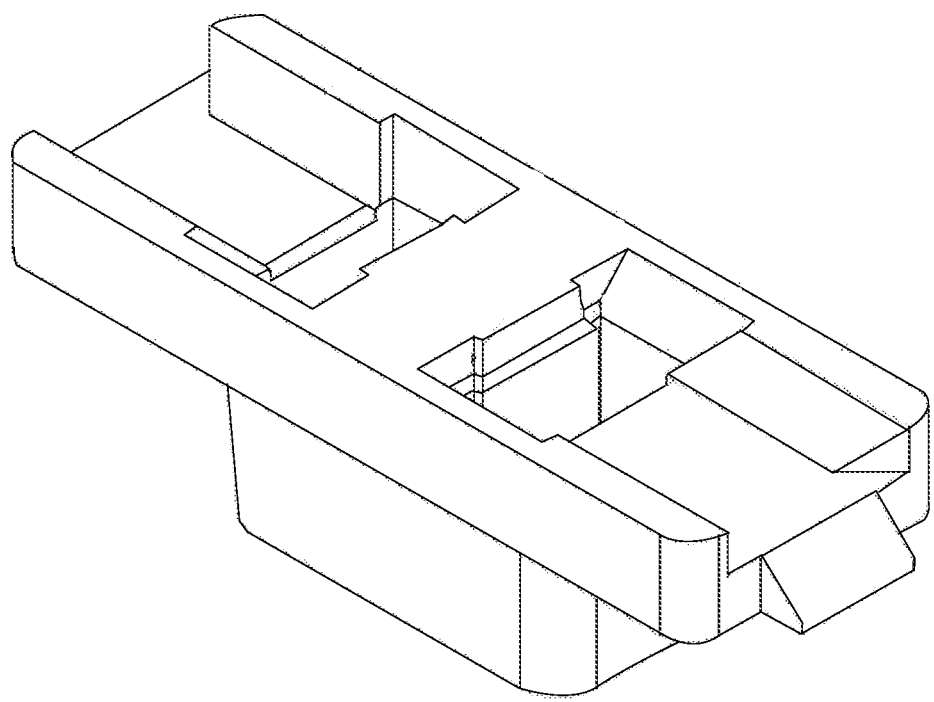
FIG. 25 illustrates a component in FIG. 24.

FIG. 25 illustrates a component in FIG. 24.

Figure 26:
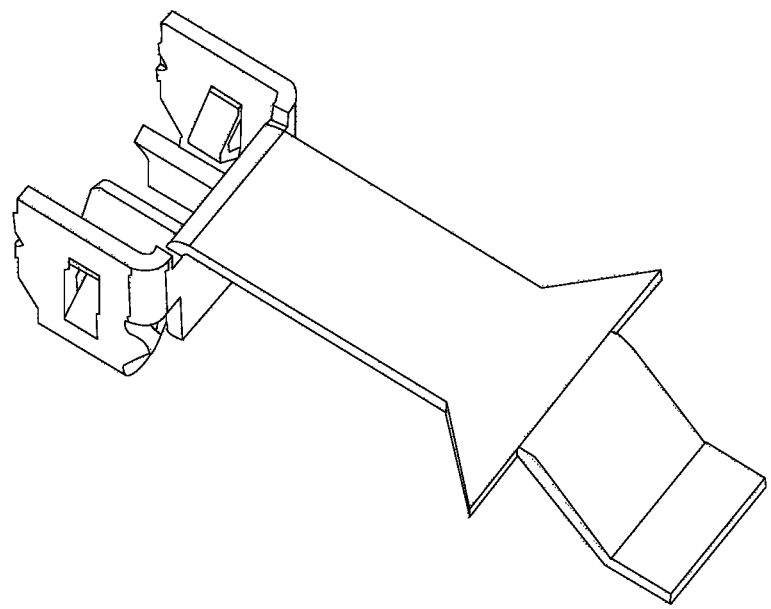
FIG. 26 illustrates another component in FIG. 24.

FIG. 26 illustrates another component in FIG. 24.

Figure 27:
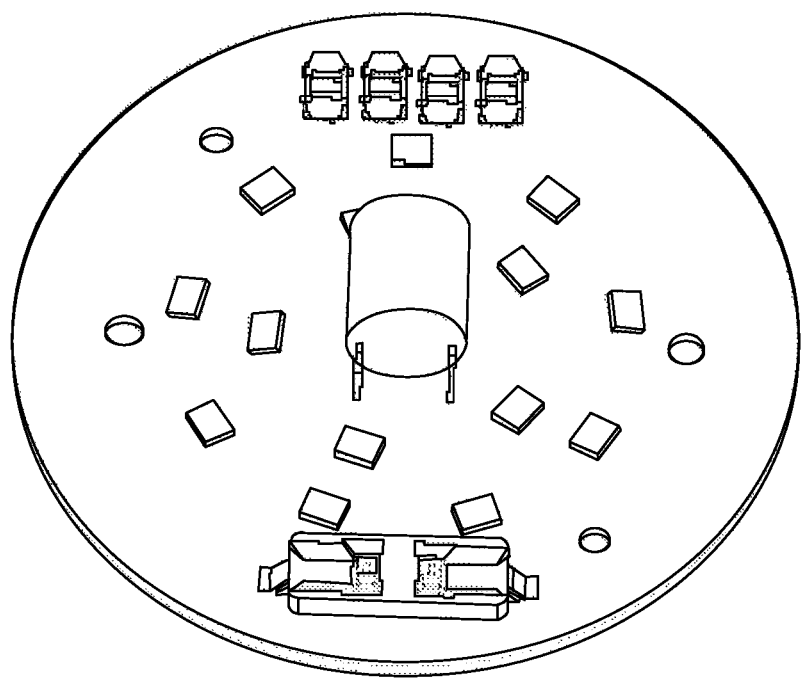
FIG. 27 illustrates the connector disposed on a light source plate.

FIG. 27 illustrates the connector disposed on a light source plate.

Figure 28:
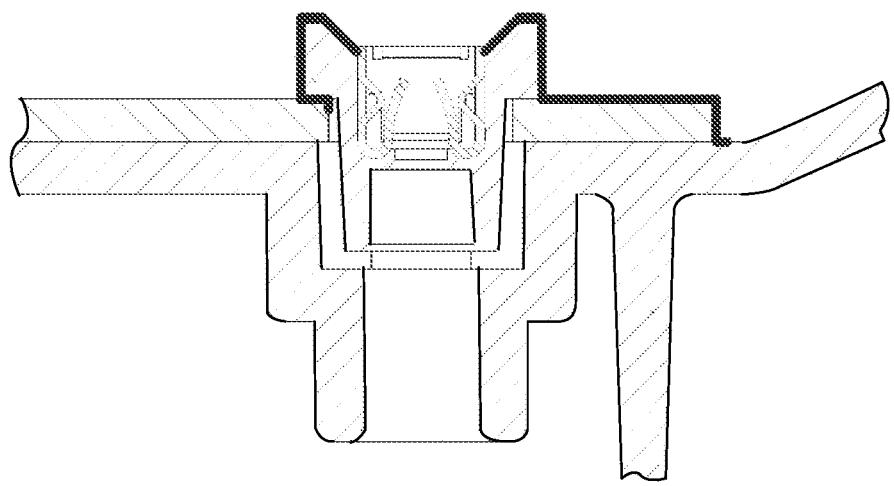
FIG. 28 illustrates an electricity distance diagram.

FIG. 28 illustrates an electricity distance diagram.

Figure 29:
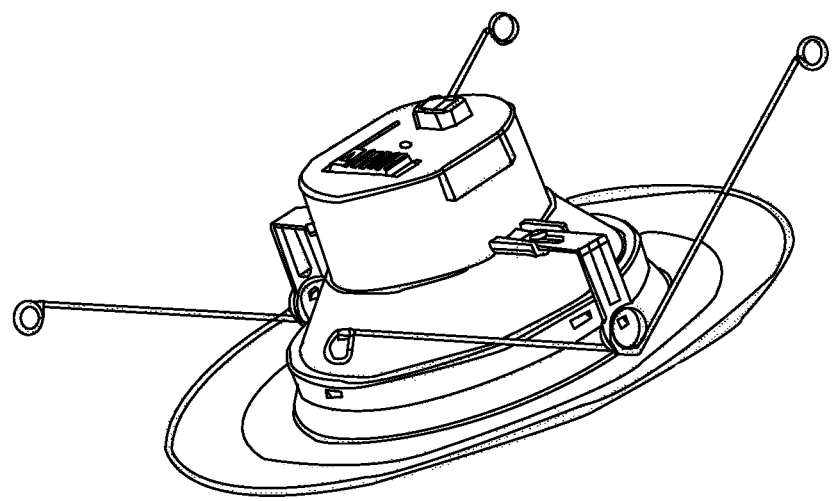
FIG. 29 illustrates another downlight example.

FIG. 29 illustrates another downlight example.

Figure 30:
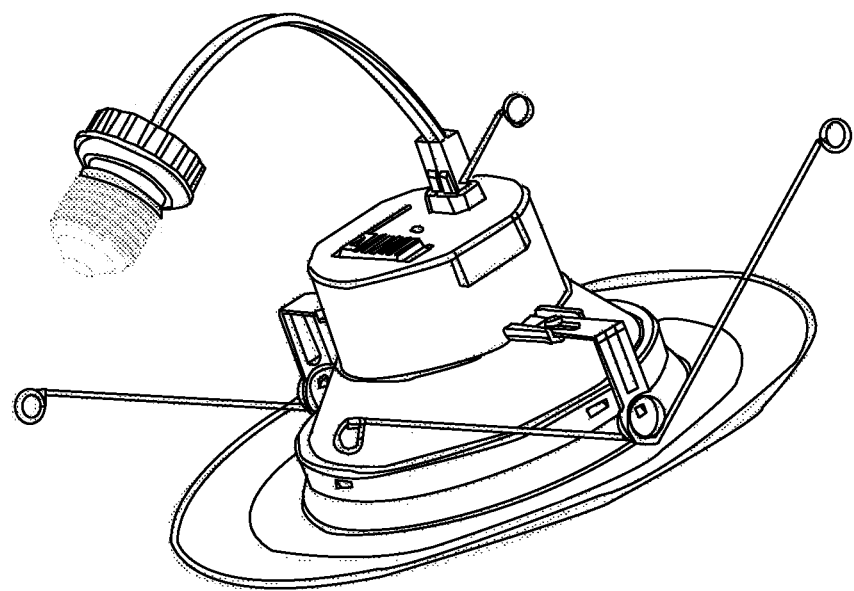
FIG. 30 illustrates the example in FIG. 29 with a wire connector.

FIG. 30 illustrates the example in FIG. 29 with a wire connector.

Figure 31:
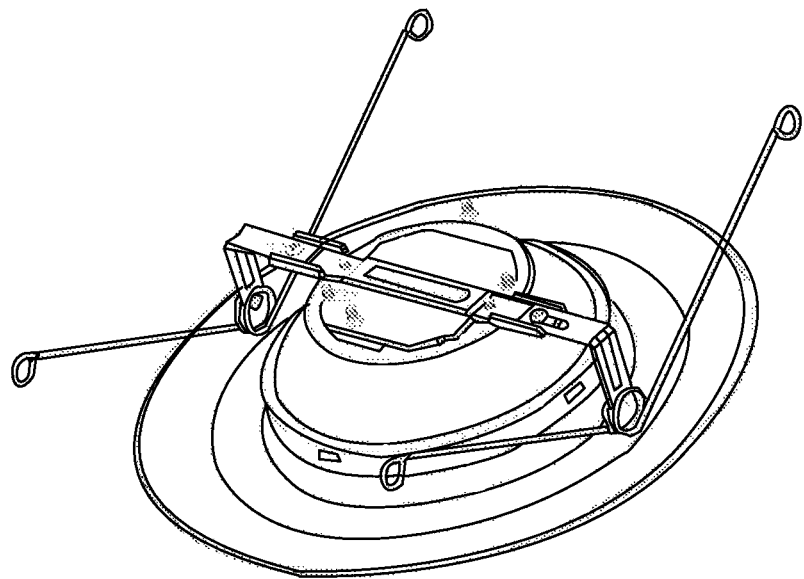
FIG. 31 illustrates a fixing bar placed on a light housing.

FIG. 31 illustrates a fixing bar placed on a light housing.

FIG. 32 illustrates a heat dissipation plate placed between a driver box and a light housing.

Figure 33:
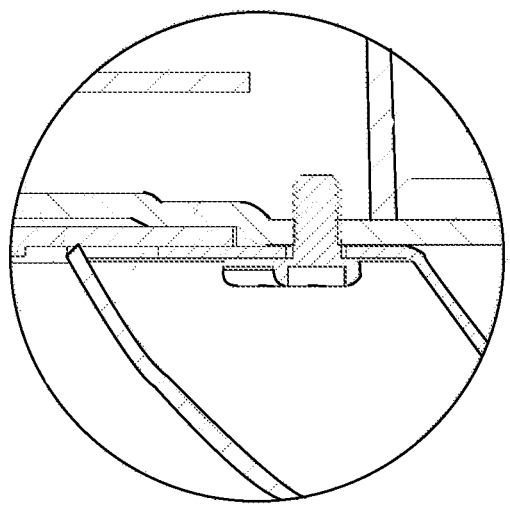
FIG. 33 illustrates a screw for transmitting heat.

FIG. 33 illustrates a screw for transmitting heat.

Figure 34:
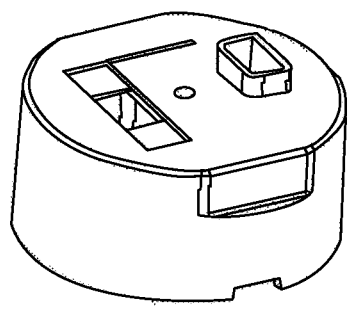
FIG. 34 illustrates a driver box example.

FIG. 34 illustrates a driver box example.

FIG. 35 illustrates a heat dissipation plate in an elongated form.

Figure 36:
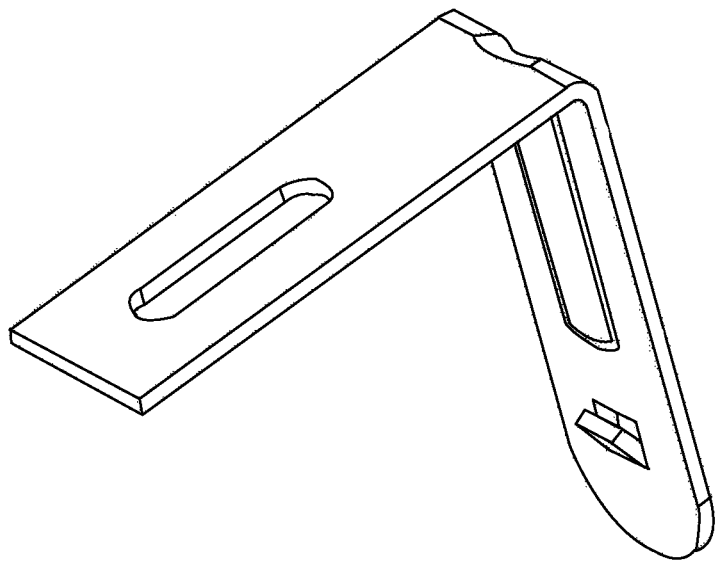
FIG. 36 illustrates a connector for connecting components.

FIG. 36 illustrates a connector for connecting components.

Figure 37:
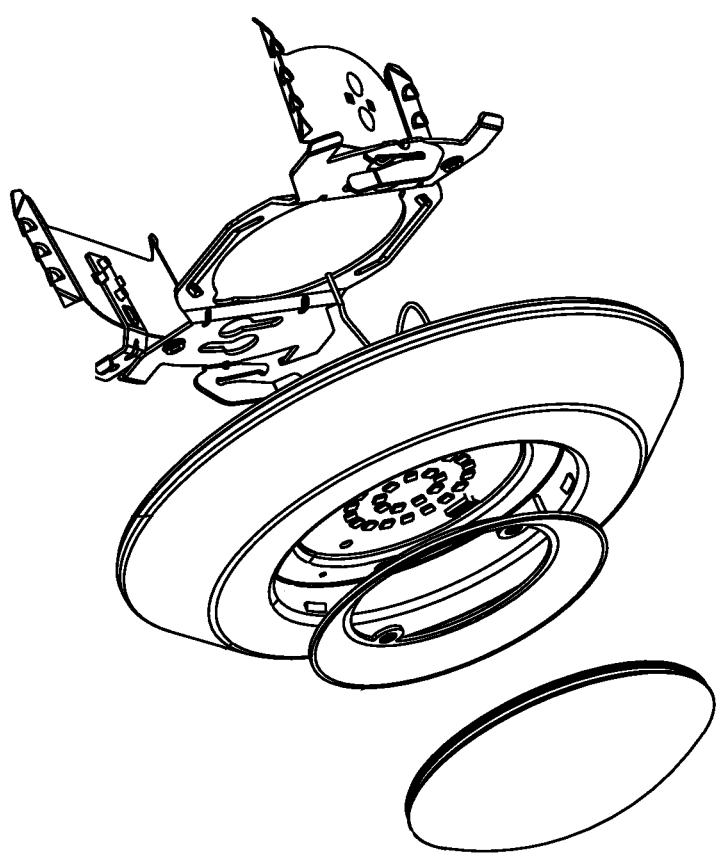
FIG. 37 illustrates an exploded view of another downlight embodiment.

FIG. 37 illustrates an exploded view of another downlight embodiment.

Figure 38:
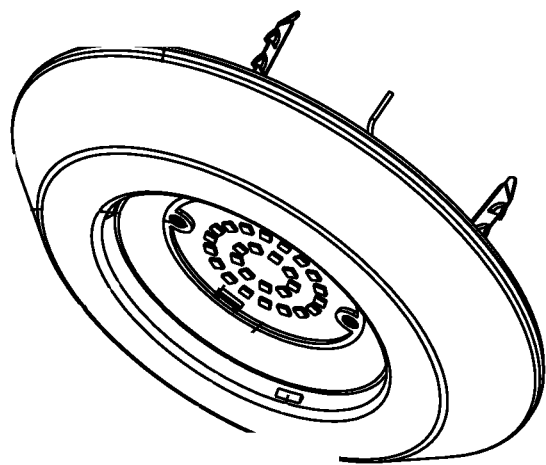
FIG. 38 illustrates a component in the example of FIG. 37.

FIG. 38 illustrates a component in the example of FIG. 37.

Figure 39:
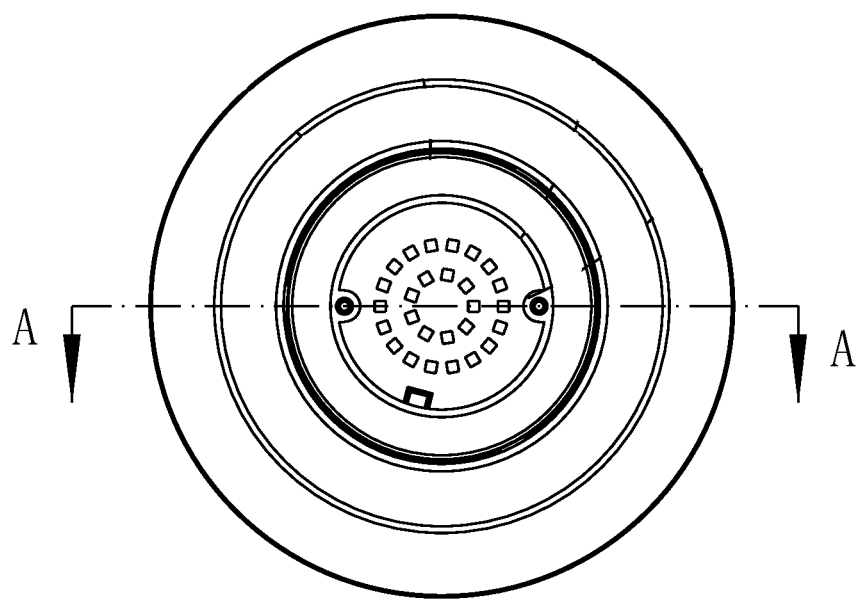
FIG. 39 illustrates a bottom view of the example in FIG. 37.

FIG. 39 illustrates a bottom view of the example in FIG. 37.

FIG. 40 illustrates another example in a cross-sectional view.

FIG. 41 illustrates a zoom-up view of a connection between components.

Figure 42:
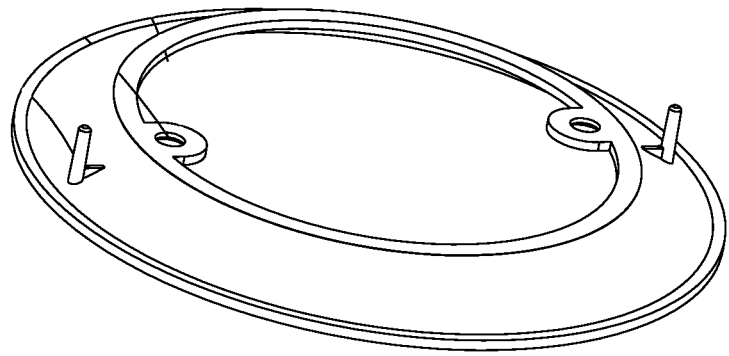
FIG. 42 illustrates a reflective cup example.

FIG. 42 illustrates a reflective cup example.

Figure 43:
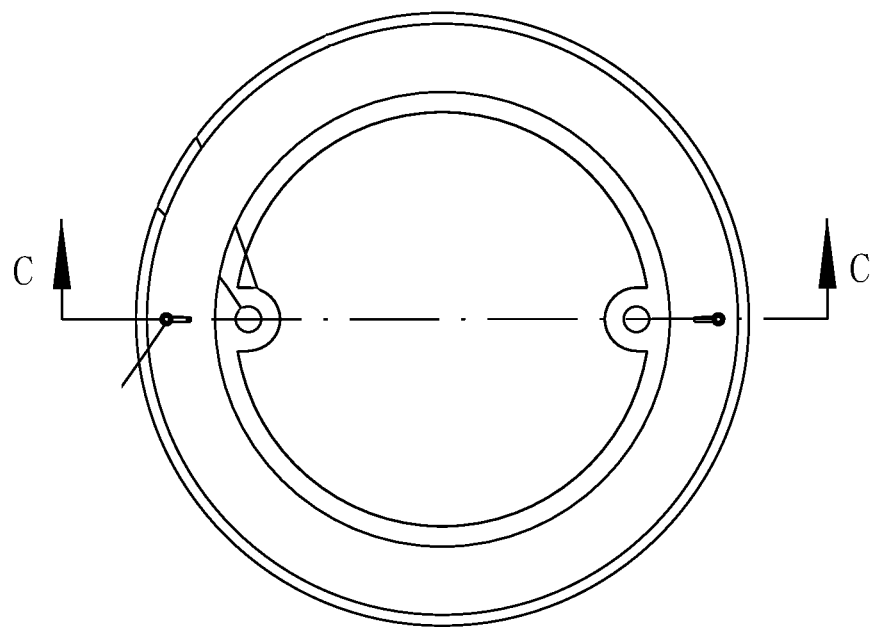
FIG. 43 illustrates a top view of the example in FIG. 42.

FIG. 43 illustrates a top view of the example in FIG. 42.

Figure 44:
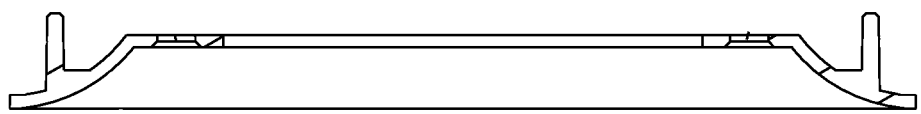
FIG. 44 illustrates a side view of the example in FIG. 42.

FIG. 44 illustrates a side view of the example in FIG. 42.

Figure 45:
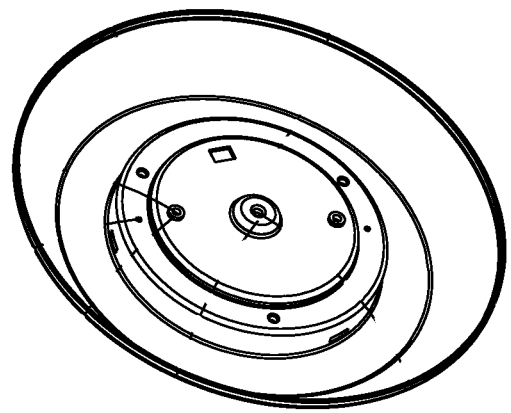
FIG. 45 illustrates a top view of a light housing.

FIG. 45 illustrates a top view of a light housing.

Figure 46:
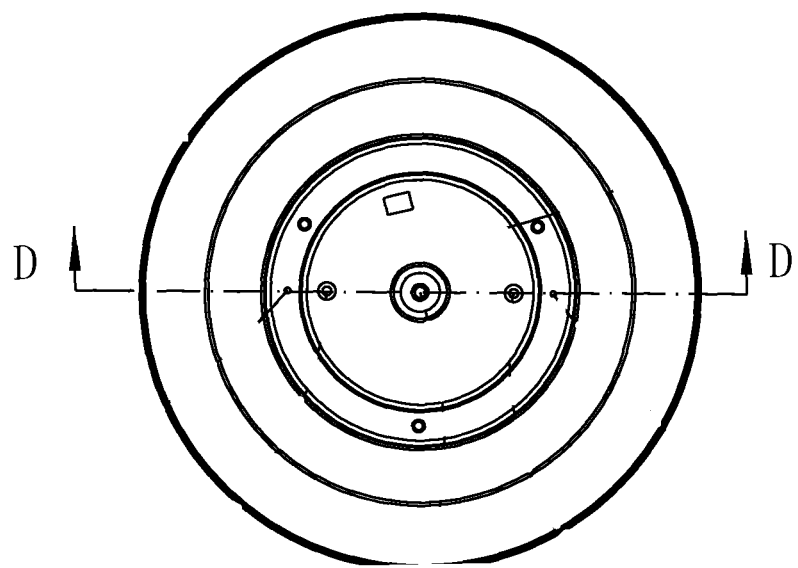
FIG. 46 illustrates another top view of the light housing example in FIG. 45.

FIG. 46 illustrates another top view of the light housing example in FIG. 45.

Figure 47:
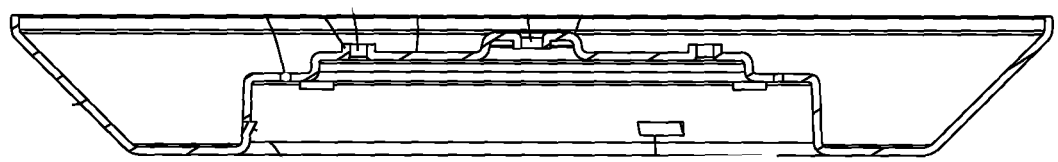
FIG. 47 illustrates a cross-sectional view of the example in FIG. 46.

FIG. 47 illustrates a cross-sectional view of the example in FIG. 46.

Figure 48:
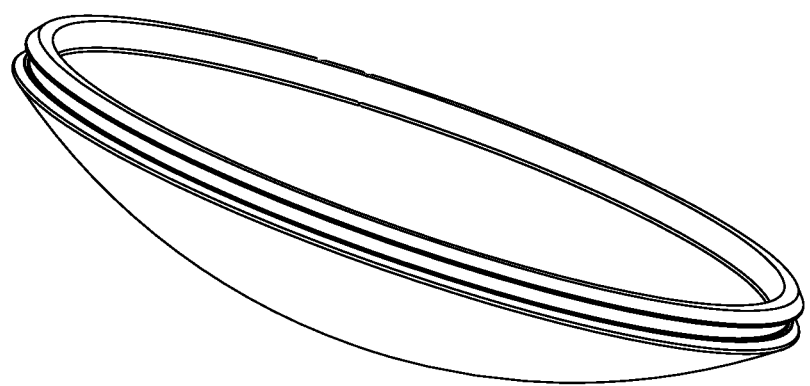
FIG. 48 illustrates a diffusion cover.

FIG. 48 illustrates a diffusion cover.

Figure 49:
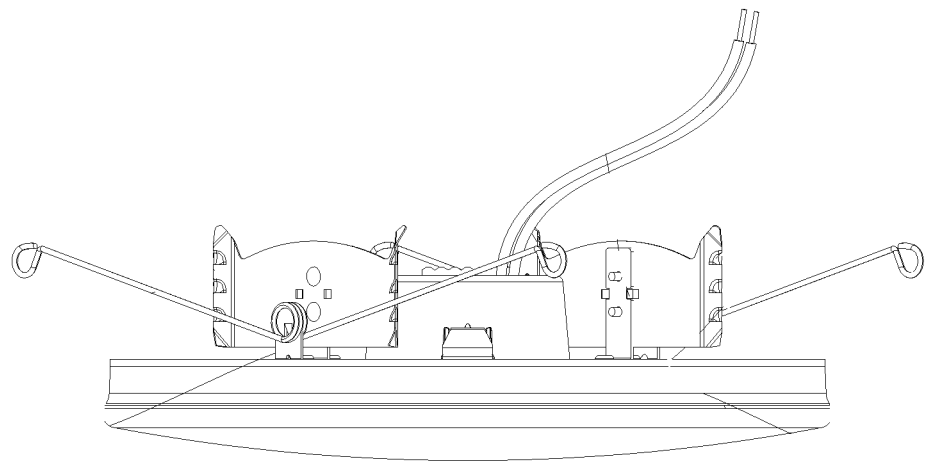
FIG. 49 illustrates a side view of a downlight example.

FIG. 49 illustrates a side view of a downlight example.

Figure 50:
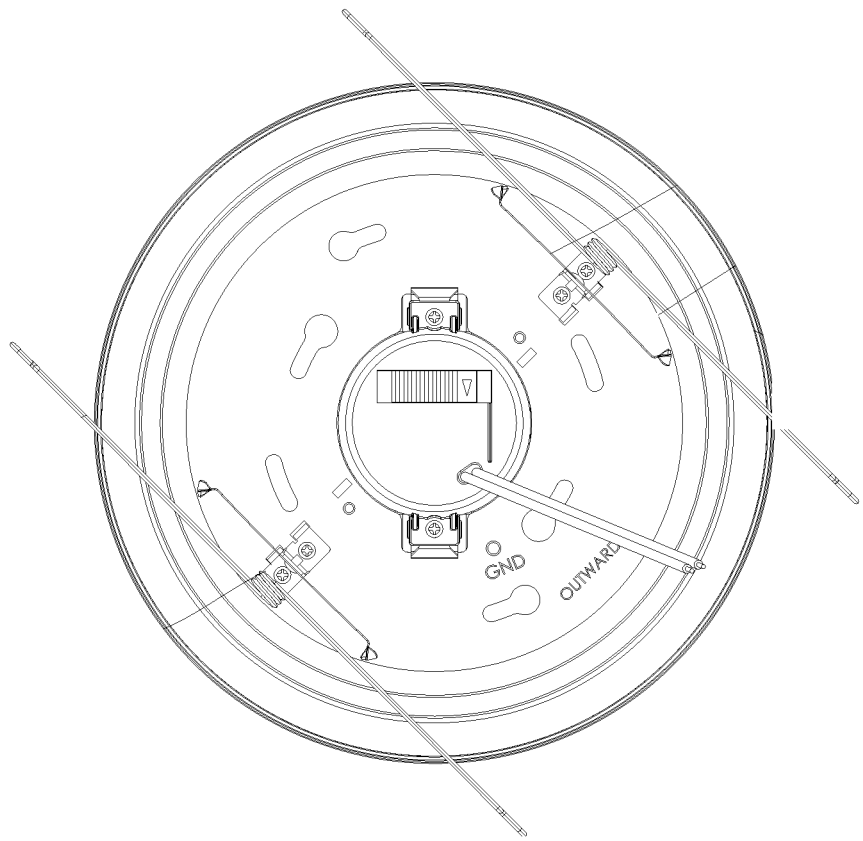
FIG. 50 illustrates a top view of the example in FIG. 49.

FIG. 50 illustrates a top view of the example in FIG. 49.

Figure 51:
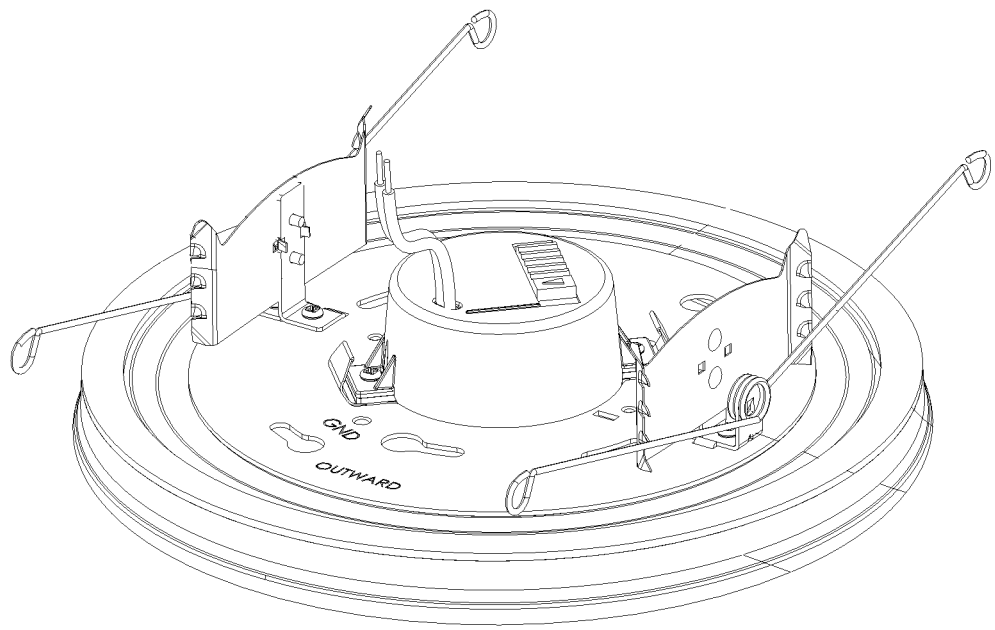
FIG. 51 illustrates another view of the example in FIG. 50.

FIG. 51 illustrates another view of the example in FIG. 50.

Figure 52:
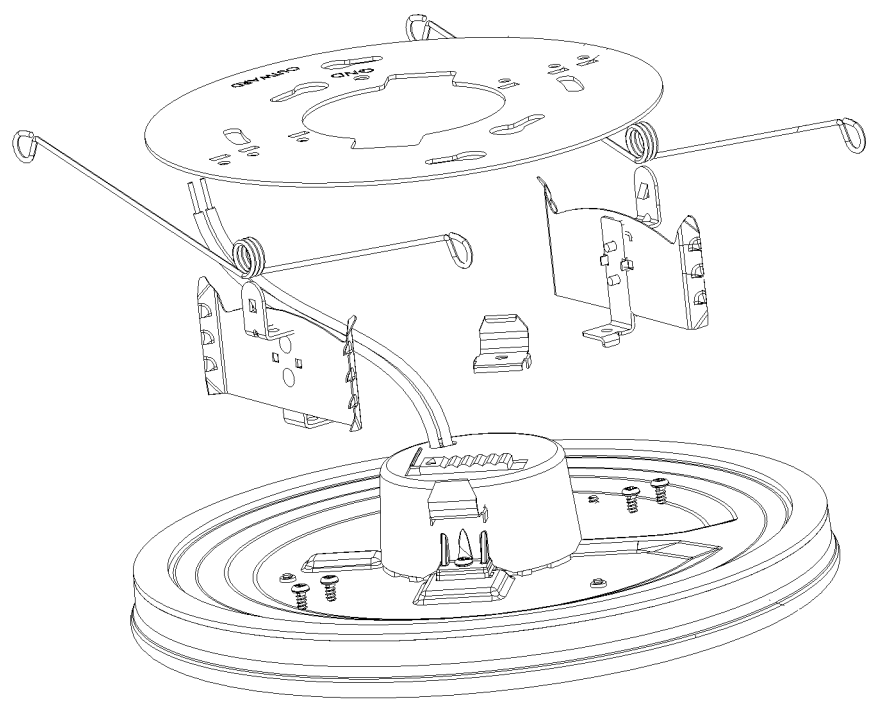
FIG. 52 illustrates an exploded view of the example in FIG. 51.

FIG. 52 illustrates an exploded view of the example in FIG. 51.

Figure 53:
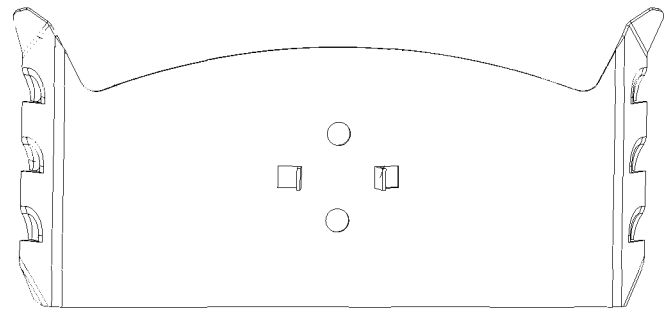
FIG. 53 illustrates an elastic plate example.

FIG. 53 illustrates an elastic plate example.

Figure 54:
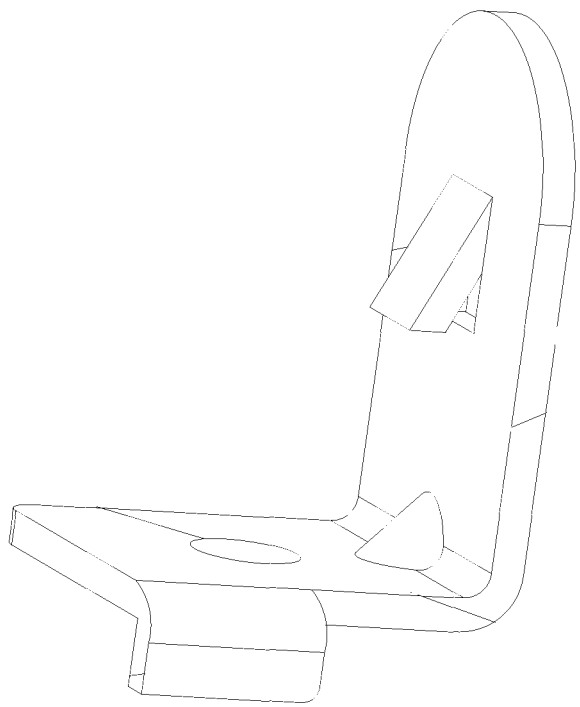
FIG. 54 illustrates a connector example.

FIG. 54 illustrates a connector example.

Figure 55:
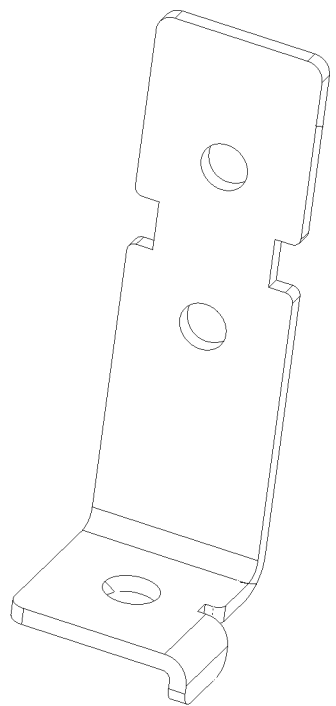
FIG. 55 illustrates another connector example.

FIG. 55 illustrates another connector example.

Figure 56:
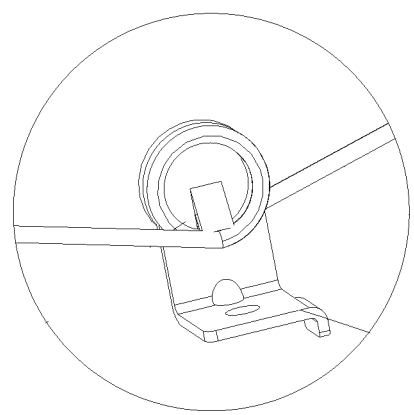
FIG. 56 illustrates a torsion spring zoom-up view.

FIG. 56 illustrates a torsion spring zoom-up view.

Figure 57:
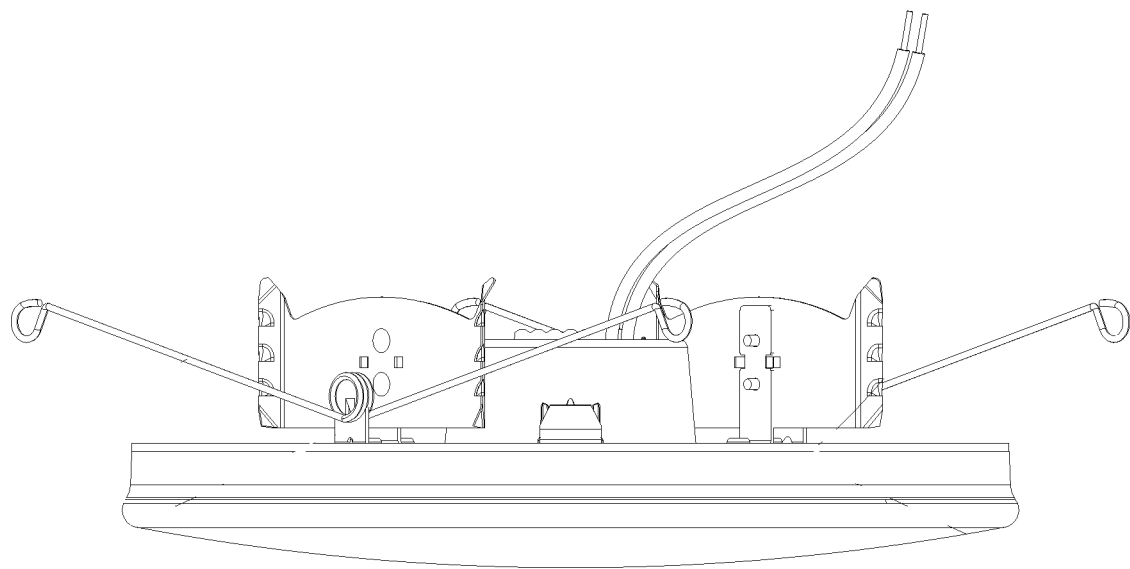
FIG. 57 illustrates another downlight example.

FIG. 57 illustrates another downlight example.

Figure 58:
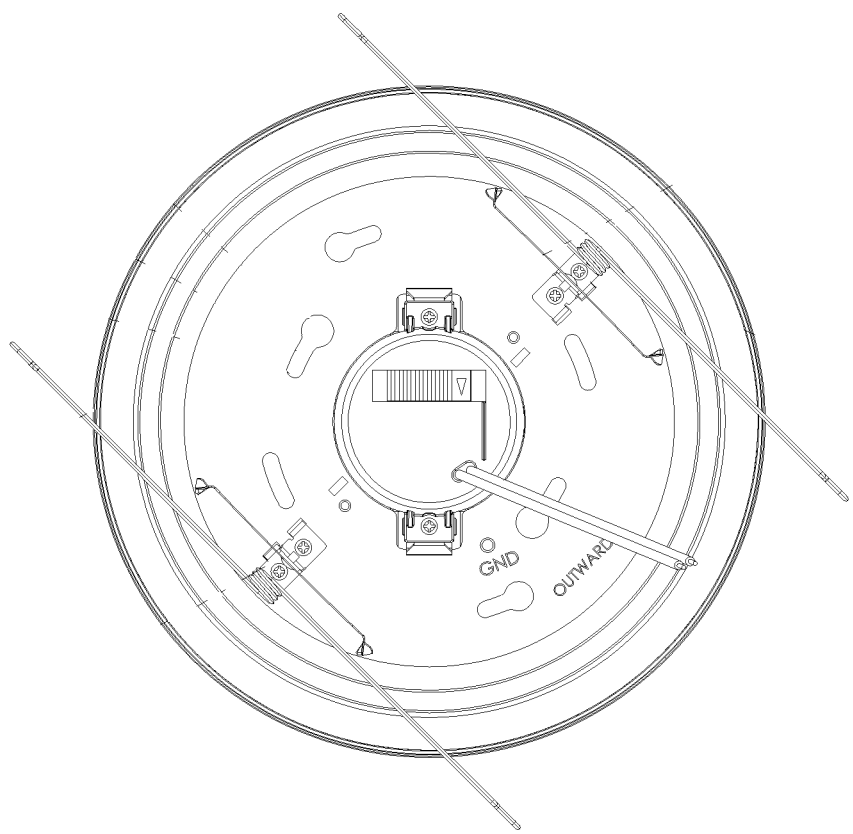
FIG. 58 illustrates a top view of the example in FIG. 57.

FIG. 58 illustrates a top view of the example in FIG. 57.

Figure 59:
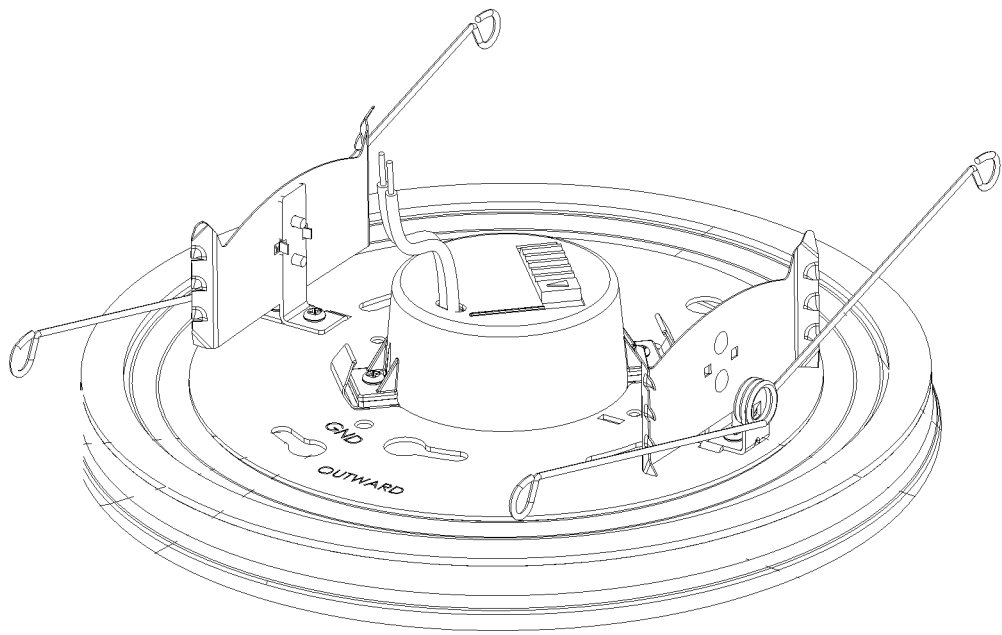
FIG. 59 illustrates another view of the example in FIG. 58.

FIG. 59 illustrates another view of the example in FIG. 58.

Figure 60:
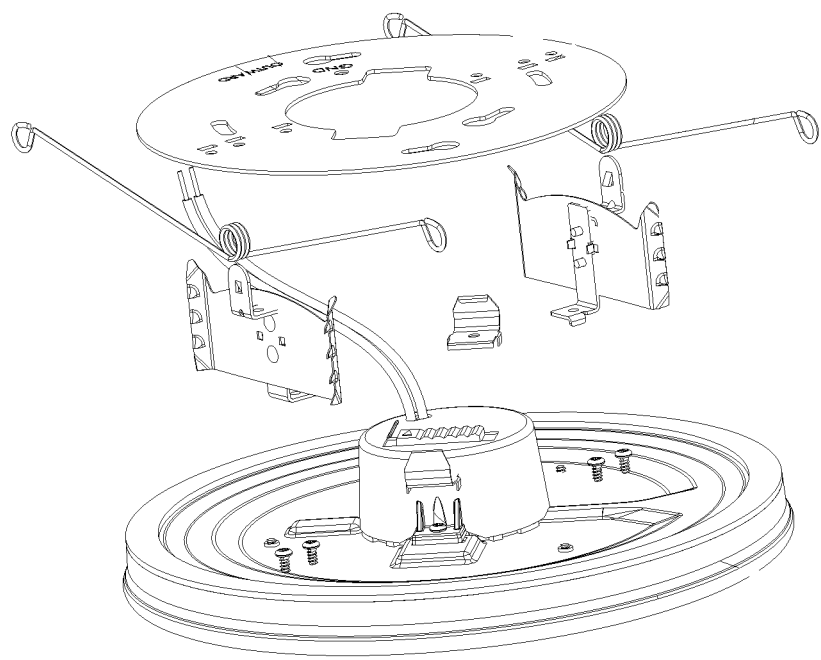
FIG. 60 illustrates an exploded view of the example in FIG. 59.

FIG. 60 illustrates an exploded view of the example in FIG. 59.

Figure 61:
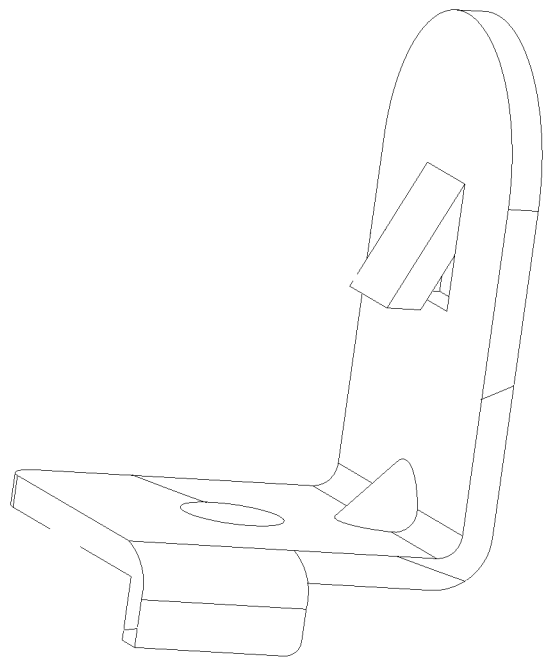
FIG. 61 illustrates a connector example.

FIG. 61 illustrates a connector example.

Figure 62:
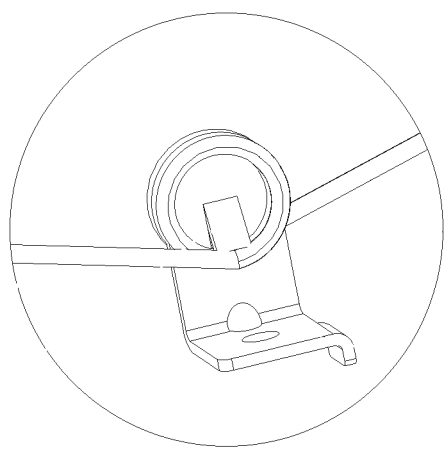
FIG. 62 illustrates a torsion spring zoom-up view.

FIG. 62 illustrates a torsion spring zoom-up view.

Figure 63:
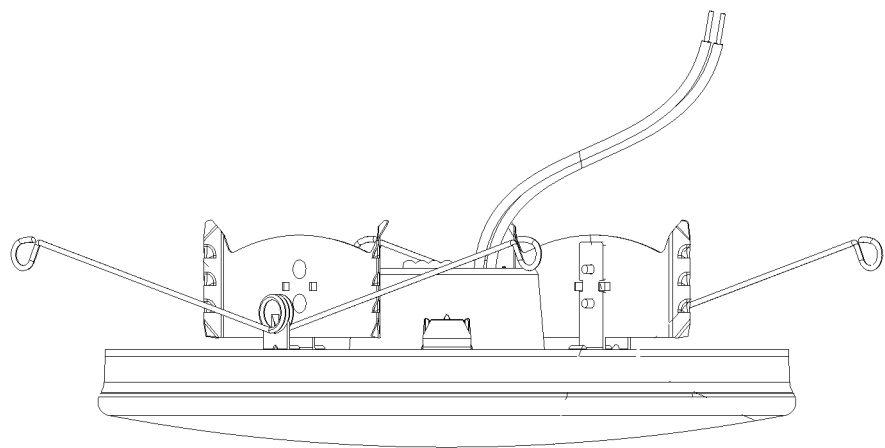
FIG. 63 illustrates another downlight example.

FIG. 63 illustrates another downlight example.

Figure 64:
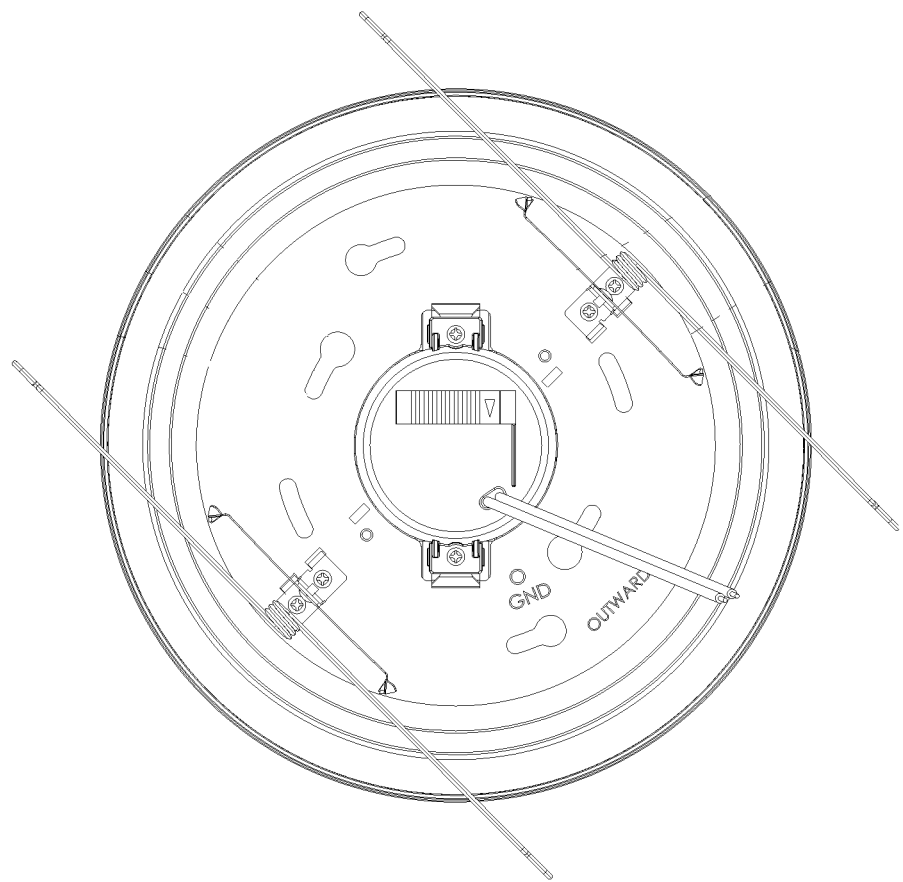
FIG. 64 illustrates a top view of the example in FIG. 63.

FIG. 64 illustrates a top view of the example in FIG. 63.

Figure 65:
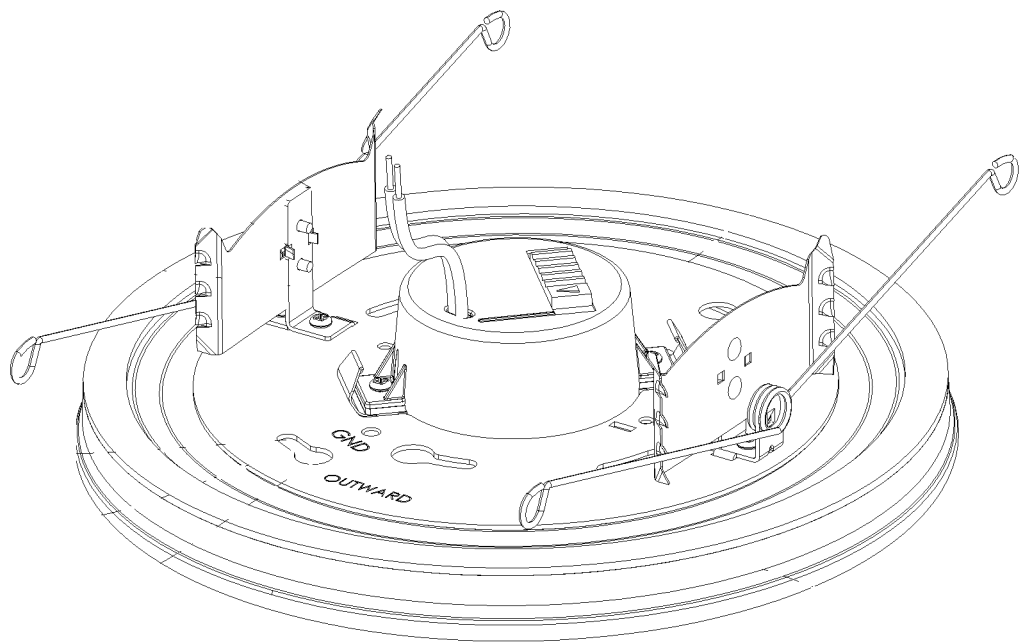
FIG. 65 illustrates another view of the example in FIG. 64.

FIG. 65 illustrates another view of the example in FIG. 64.

Figure 66:
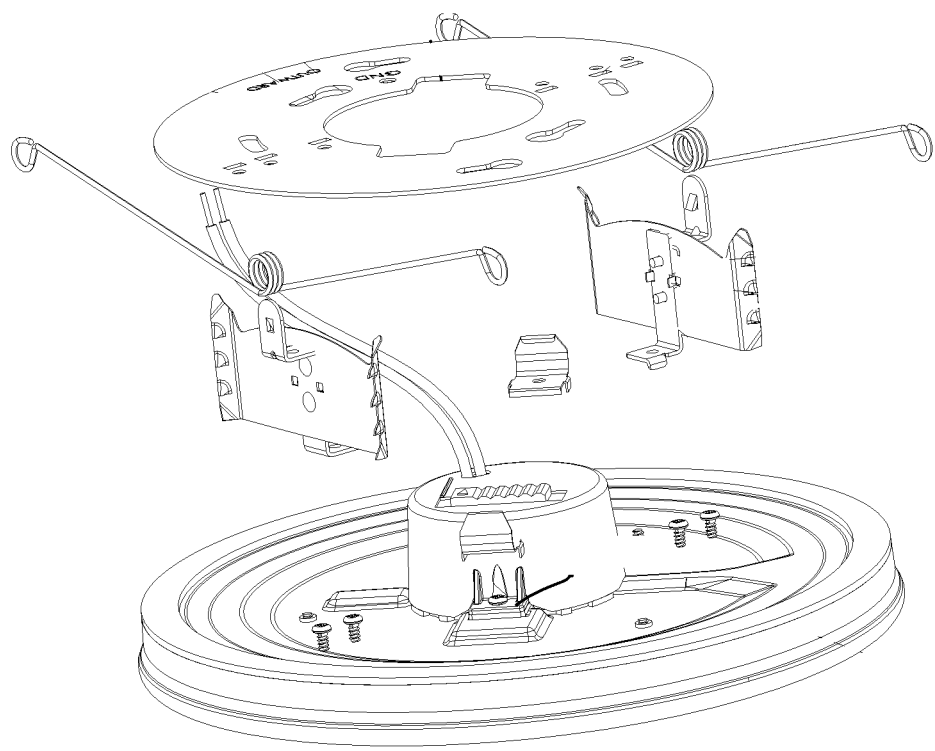
FIG. 66 illustrates an exploded view of the example in FIG. 65.

FIG. 66 illustrates an exploded view of the example in FIG. 65.

Figure 67:
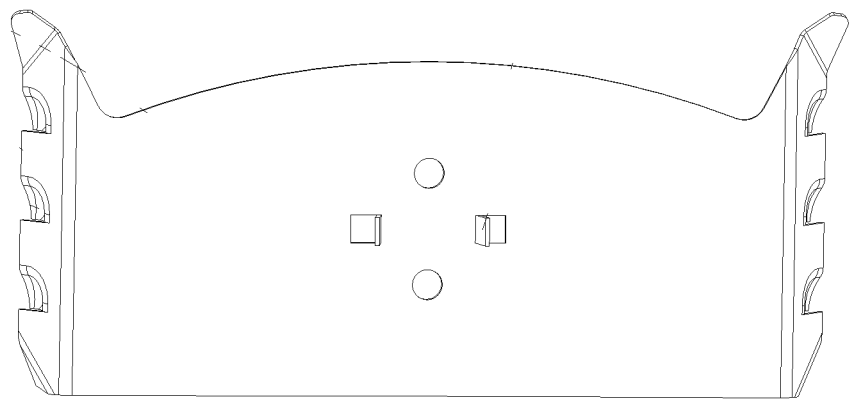
FIG. 67 illustrates an elastic plate example.

FIG. 67 illustrates an elastic plate example.

Figure 68:
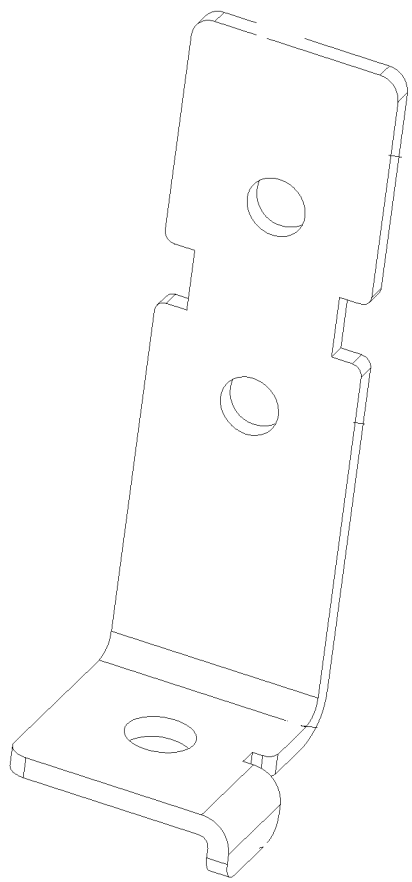
FIG. 68 illustrates a connector example.

FIG. 68 illustrates a connector example.

Figure 69:
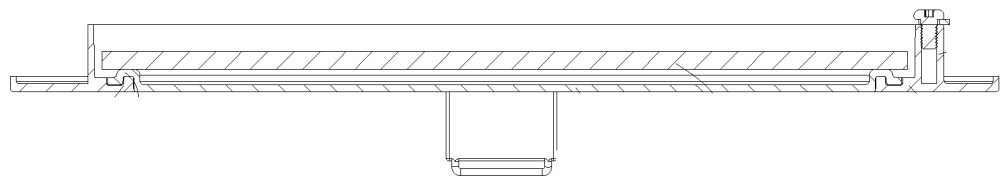
FIG. 69 illustrates a side view of a diffusion cover and related components.

FIG. 69 illustrates a side view of a diffusion cover and related components.

FIG. 70 illustrates a zoom-up view of the diffusion cover and related components.

Figure 71:
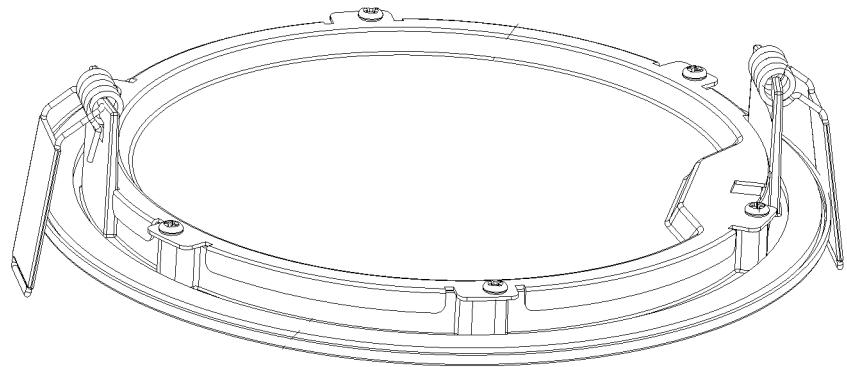
FIG. 71 illustrates a rim part example.

FIG. 71 illustrates a rim part example.

Figure 72:
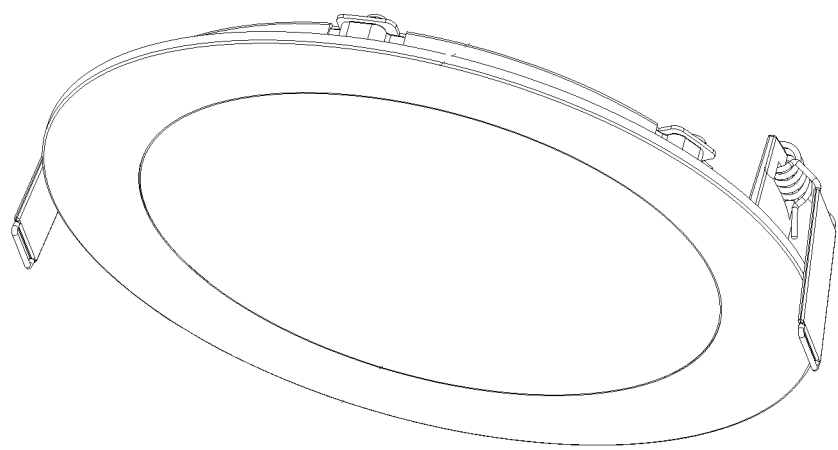
FIG. 72 illustrates another view of the example in FIG. 71.

FIG. 72 illustrates another view of the example in FIG. 71.

Figure 73:
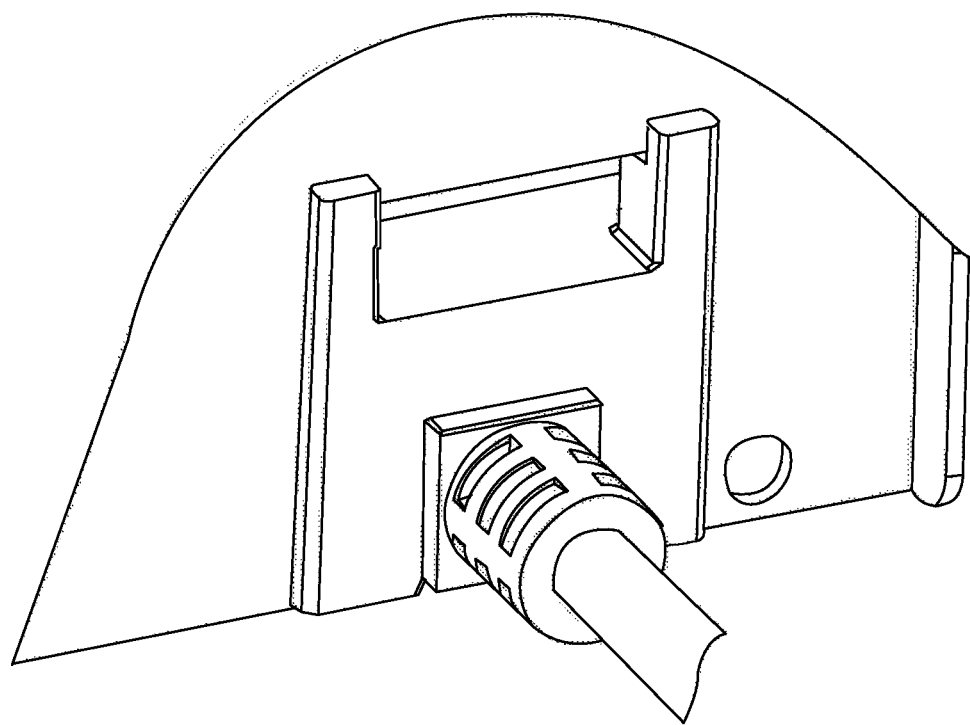
FIG. 73 illustrates a wiring unit example.

FIG. 73 illustrates a wiring unit example.

Figure 74:
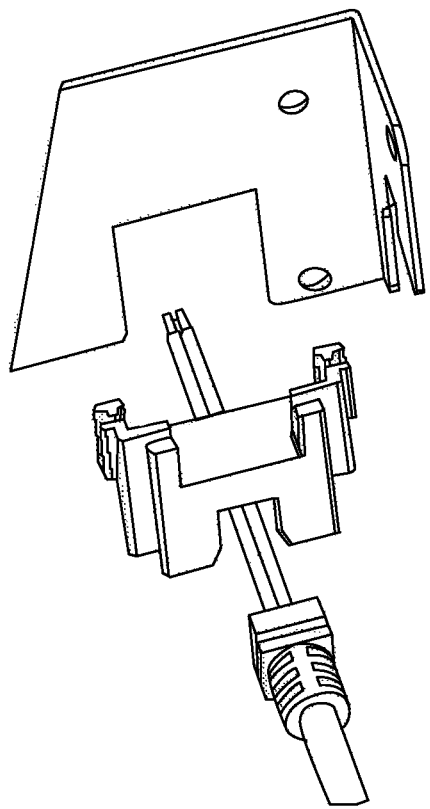
FIG. 74 illustrates an exploded view of the example in FIG. 73.

FIG. 74 illustrates an exploded view of the example in FIG. 73.

Figure 75:
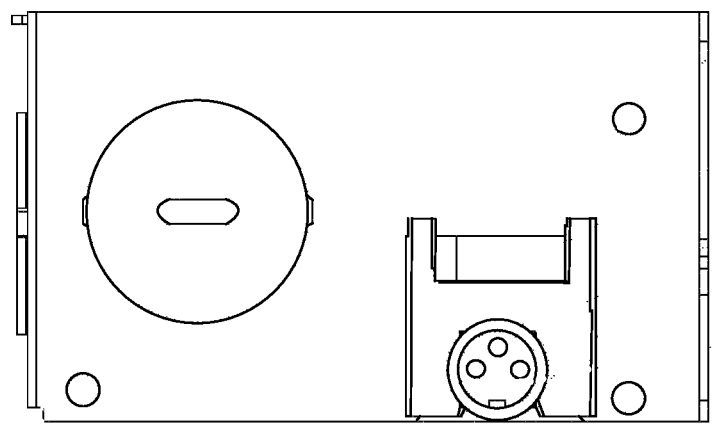
FIG. 75 illustrates a driver box with the wiring unit.

FIG. 75 illustrates a driver box with the wiring unit.

Figure 76:
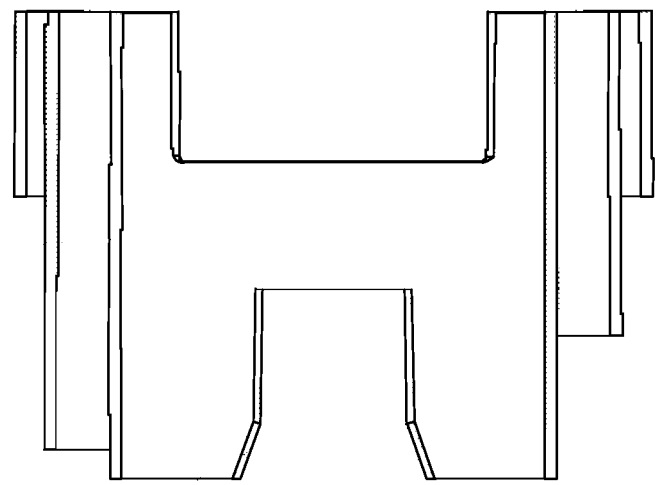
FIG. 76 illustrates a side view of the wiring unit.

FIG. 76 illustrates a side view of the wiring unit.

Figure 77:
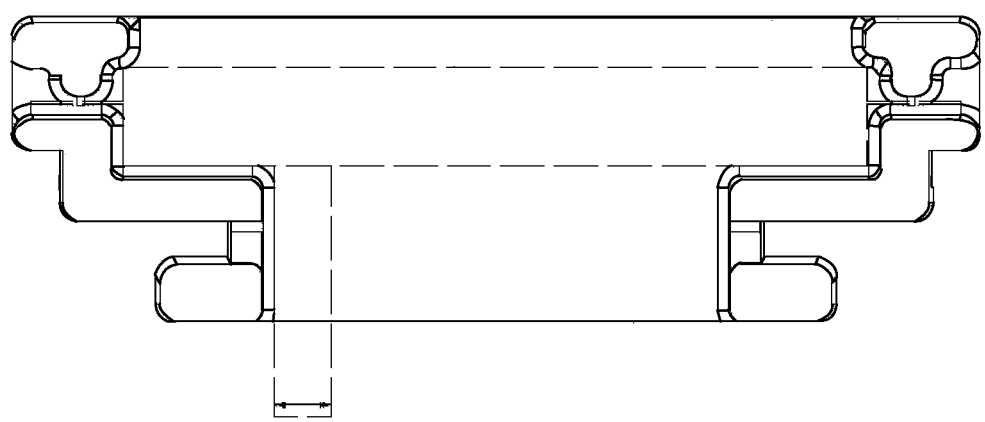
FIG. 77 illustrates another view of the wiring unit.

FIG. 77 illustrates another view of the wiring unit.

Figure 78:
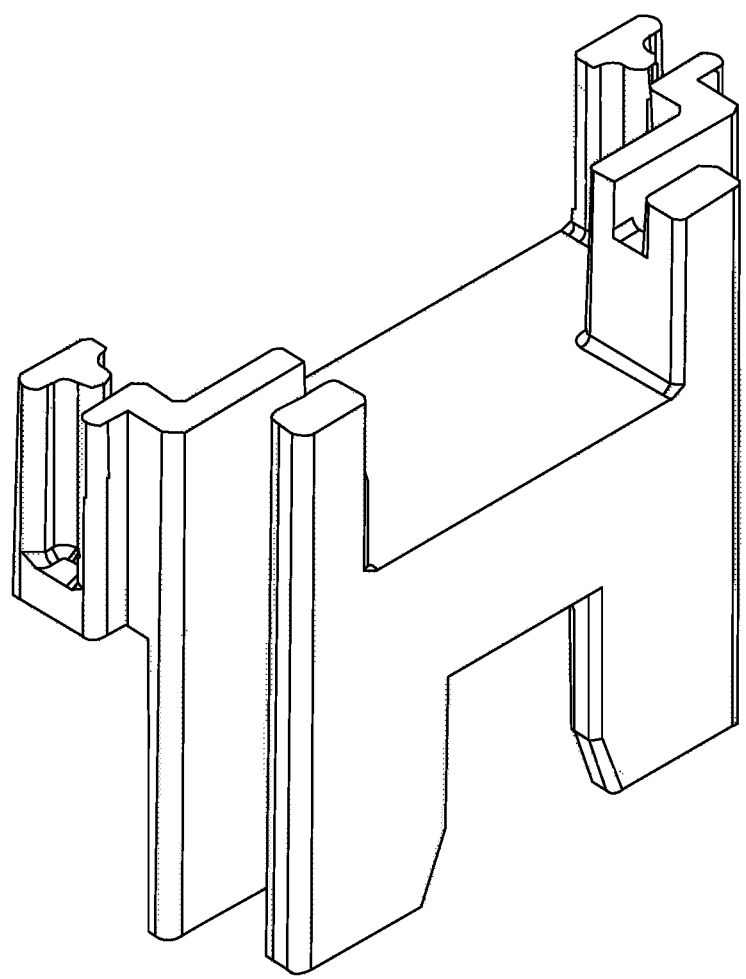
FIG. 78 illustrates another view of the wiring unit.

FIG. 78 illustrates another view of the wiring unit.

Figure 79:
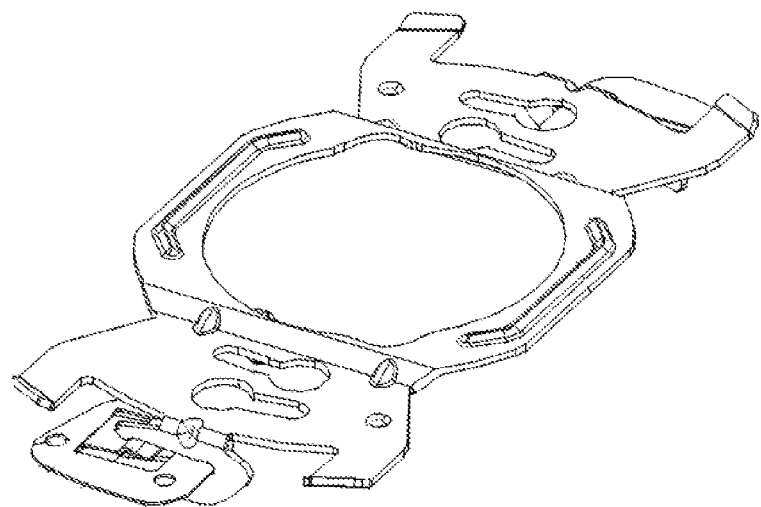
FIG. 79 illustrates a fixing bracket example.

FIG. 79 illustrates a fixing bracket example.

Figure 80:
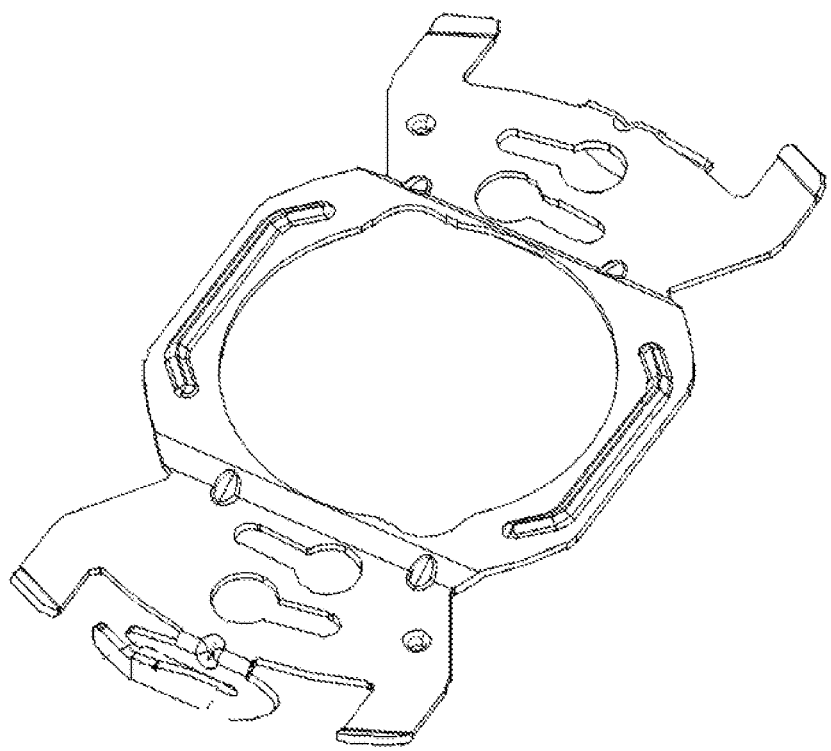
FIG. 80 illustrates another fixing bracket example.

FIG. 80 illustrates another fixing bracket example.

Figure 81:
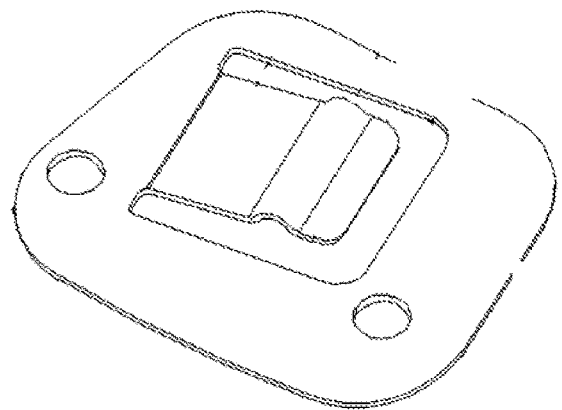
FIG. 81 illustrates an elastic stop unit example.

FIG. 81 illustrates an elastic stop unit example.

Figure 82:
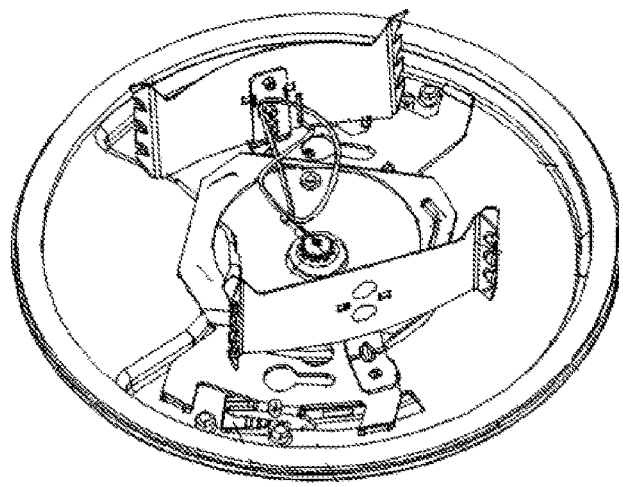
FIG. 82 illustrates a top view of a downlight example with the fixing bracket.

FIG. 82 illustrates a top view of a downlight example with the fixing bracket.

Figure 83:
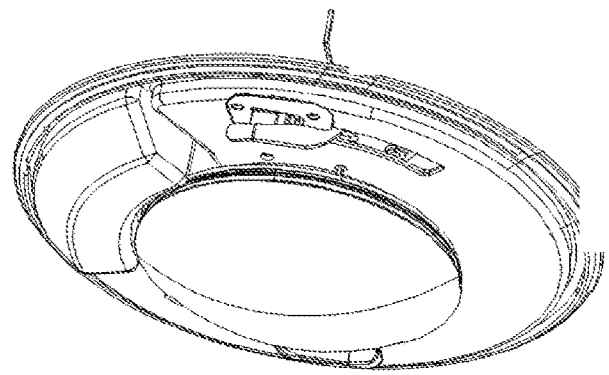
FIG. 83 illustrates another view of the example in FIG. 82.

FIG. 83 illustrates another view of the example in FIG. 82.

Figure 84:
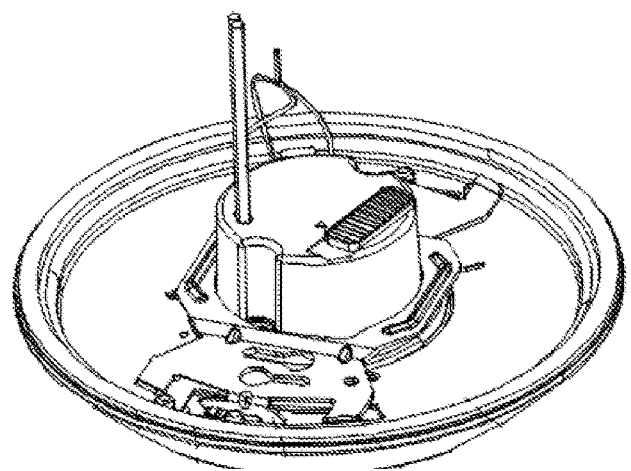
FIG. 84 illustrates a top view of another downlight example.

FIG. 84 illustrates a top view of another downlight example.

Figure 85:
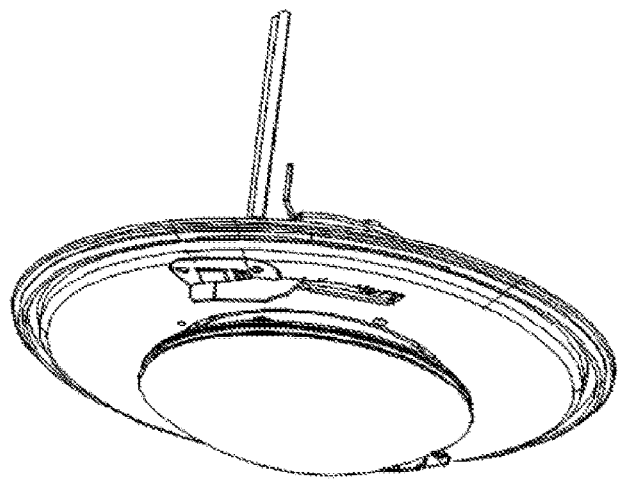
FIG. 85 illustrates another view of the example in FIG. 84.

FIG. 85 illustrates another view of the example in FIG. 84.

Figure 86:
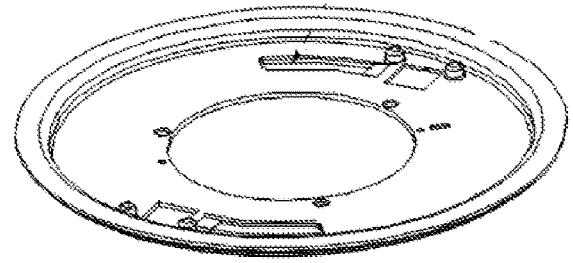
FIG. 86 illustrates a component in the example of FIG. 85.

FIG. 86 illustrates a component in the example of FIG. 85.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A downlight apparatus, comprising:
a light source;
a driver box for storing a driver, wherein the driver is connected to an external power source to generate a driving current to the light source;
a light housing with a light holder and a rim, wherein the light source is stored in the light holder, wherein the rim defines a light opening for a light of the light source to escape; and
a heat dissipation plate placed between the light holder and the driver box for carrying away both heat of the driver box and the light source, wherein the heat dissipation plate is a separate metal piece from the driver box and the light housing, wherein the heat dissipation plate has a portion not covered by the light holder and the driver box and exposed to air, wherein the heat dissipation plate is an elongated bar, wherein a protruding rib structure is formed in a middle of the elongated bar facing to the light source, wherein a middle part of the elongated bar has a peripheral area and a protruding area, the protruding rib structure is at the peripheral area surrounding by the protruding area, wherein the protruding area and the peripheral are at two different surfaces.

2. The downlight apparatus of claim 1, wherein the light holder has a holder plate and a holder wall defining a holder cavity, wherein the light source is placed on an inner side of the holder plate in the holder cavity, wherein the holder plate has a substantial diameter as the driver box, wherein the elongated bar has two ends exposed outside an overlapping area of the holder plate and the driver box.

3. The downlight apparatus of claim 2, wherein the elongated bar has a bar body and two bar blocks, wherein the bar blocks are protruding from the bar body, limiting a relative position of the driver box to the light holder.

4. The downlight apparatus of claim 3, wherein the bar blocks are a folded block from the bar body.

5. The downlight apparatus of claim 1, wherein the elongated bar is attached with two torsion springs on two bar ends of the elongated bar.

6. The downlight apparatus of claim 5, wherein the two bar ends are folded with respect to a bar body of the elongated bar.

7. The downlight apparatus of claim 1, wherein a driver plate is placed inside the driver box, wherein the driver plate is kept a distance from a bottom of the driver box and the light holder.

8. The downlight apparatus of claim 7, wherein the driver plate is exposed facing to the elongated bar.

9. The downlight apparatus of claim 7, wherein the light source comprises a light source plate attached to the heat dissipation plate.

10. The downlight apparatus of claim 1, wherein a top plate of the driver box has a wire socket and a manual switch, wherein the wire socket is connected to a power wire and the manual switch is used for adjusting a setting of the light source.

11. The downlight apparatus of claim 10, wherein the top plate of the driver box further has a rotation switch for continuously setting a maximum light intensity of the light source.

12. The downlight apparatus of claim 1, wherein the light housing is made of metal material and is connected to ground via the heat dissipation plate.

13. The downlight apparatus of claim 1, wherein a light source plate of the light source is connected to the elongated bar with a metal screw for carrying heat away.

14. The downlight apparatus of claim 1, wherein the light source comprises a LED module, a light guide plate and a light passing cover, wherein the rim has a protruding part extended inwardly from a connection of the rim and a holder wall of the light holder corresponding to a curved part of the light passing cover.

15. The downlight apparatus of claim 14, wherein the curved part of the light passing cover engages the protruding part of the rim.

16. The downlight apparatus of claim 15, wherein the protruding part has a convex part and a concave part fitting a surface of the curved part of the light passing cover.

17. The downlight apparatus of claim 16, wherein the light passing cover is clipped between the light guide plate and the protruding part of the rim.

* * * * *